(12) United States Patent
Van Dierendonck et al.

(10) Patent No.: US 9,116,234 B2
(45) Date of Patent: Aug. 25, 2015

(54) SYSTEM, METHOD, AND COMPUTER PROGRAM FOR A LOW POWER AND LOW COST GNSS RECEIVER

(75) Inventors: Keith Van Dierendonck, Calgary (CA); Ming Xu, Calgary (CA); Pejman Lotfali Kazemi, Sunnyvale, CA (US)

(73) Assignee: Baseband Technologies Inc, Calgavy, AB (CA)

( * ) Notice: Subject to any disclaimer, the term of this patent is extended or adjusted under 35 U.S.C. 154(b) by 11 days.

(21) Appl. No.: 14/234,838

(22) PCT Filed: Jul. 26, 2012

(86) PCT No.: PCT/CA2012/000699
§ 371 (c)(1),
(2), (4) Date: Apr. 25, 2014

(87) PCT Pub. No.: WO2013/016800
PCT Pub. Date: Feb. 7, 2013

(65) Prior Publication Data
US 2015/0036724 A1 Feb. 5, 2015

Related U.S. Application Data

(60) Provisional application No. 61/513,149, filed on Jul. 29, 2011.

(51) Int. Cl.
*H04B 1/00* (2006.01)
*G01S 19/42* (2010.01)
*H04B 1/707* (2011.01)
*H04B 1/7075* (2011.01)

(52) U.S. Cl.
CPC .............. *G01S 19/42* (2013.01); *H04B 1/707* (2013.01); *H04B 1/7075* (2013.01)

(58) Field of Classification Search
CPC ....... H04B 1/7075; G01S 19/13; G01S 19/24; G01S 19/29; G01S 19/31; G01S 19/38; G01S 19/39
USPC ........................................................ 375/147
See application file for complete search history.

(56) References Cited

U.S. PATENT DOCUMENTS

| | | | |
|---|---|---|---|
| 6,417,801 B1 | 7/2002 | van Diggelen | |
| 7,133,772 B2 | 11/2006 | van Diggelen | |
| 2002/0005802 A1* | 1/2002 | Bryant et al. | 342/357.01 |
| 2005/0055160 A1* | 3/2005 | King | 701/213 |
| 2008/0129591 A1 | 6/2008 | Lamance et al. | |
| 2010/0245168 A1 | 9/2010 | Rollet et al. | |
| 2010/0253578 A1* | 10/2010 | Mantovani | 342/357.76 |
| 2012/0289243 A1* | 11/2012 | Tarlow et al. | 455/456.1 |
| 2012/0293366 A1* | 11/2012 | Liu et al. | 342/357.26 |

FOREIGN PATENT DOCUMENTS

WO    WO2006/124685    11/2006

* cited by examiner

*Primary Examiner* — Shuwang Liu
*Assistant Examiner* — David S Huang
(74) *Attorney, Agent, or Firm* — Adrian D. Battison; Ade & Company Inc.

(57) ABSTRACT

A system and method for an advanced GNSS receiver that is operable to provide an ultra-fast, autonomous and reliable TTFF that does not require an initial position, at the same time, minimizing processing power and hardware cost. The system and method is able to reliably recover the time of transmission of the received signals using I/Q sample lengths on the order of milliseconds, and is capable of operating autonomously without the need of aiding technologies such as the AGPS technology for which there are privacy and service availability concerns.

12 Claims, 10 Drawing Sheets

System Diagram

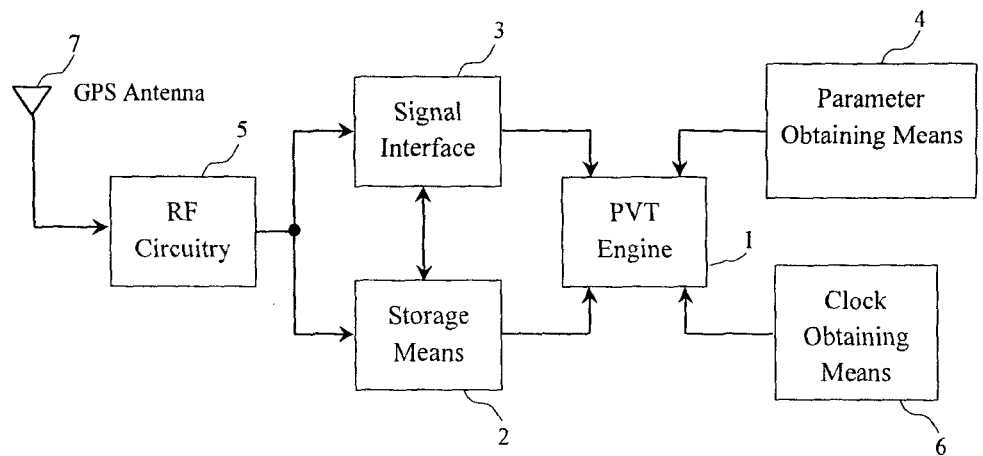
FIG. 1  System Diagram
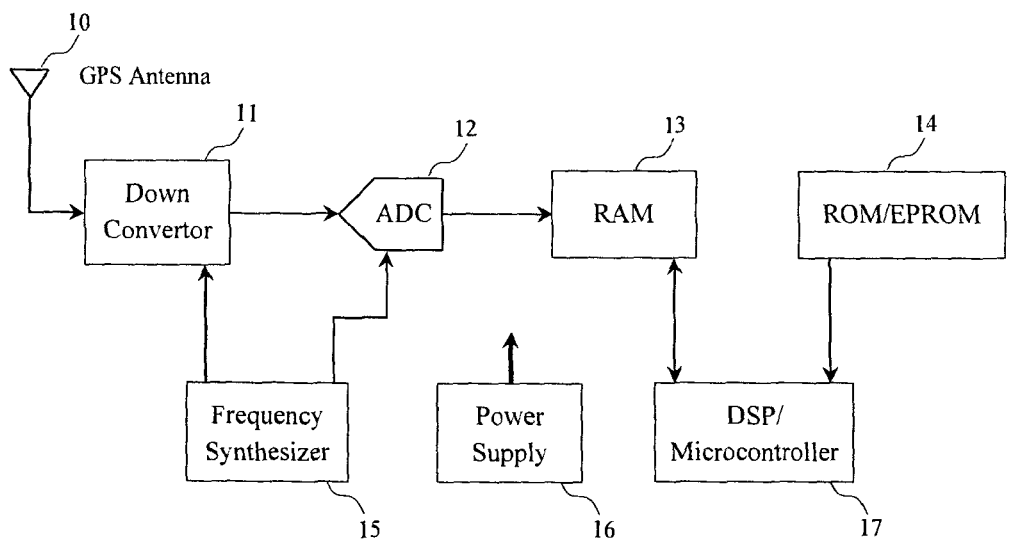
FIG. 2  Hardware Architecture Diagram

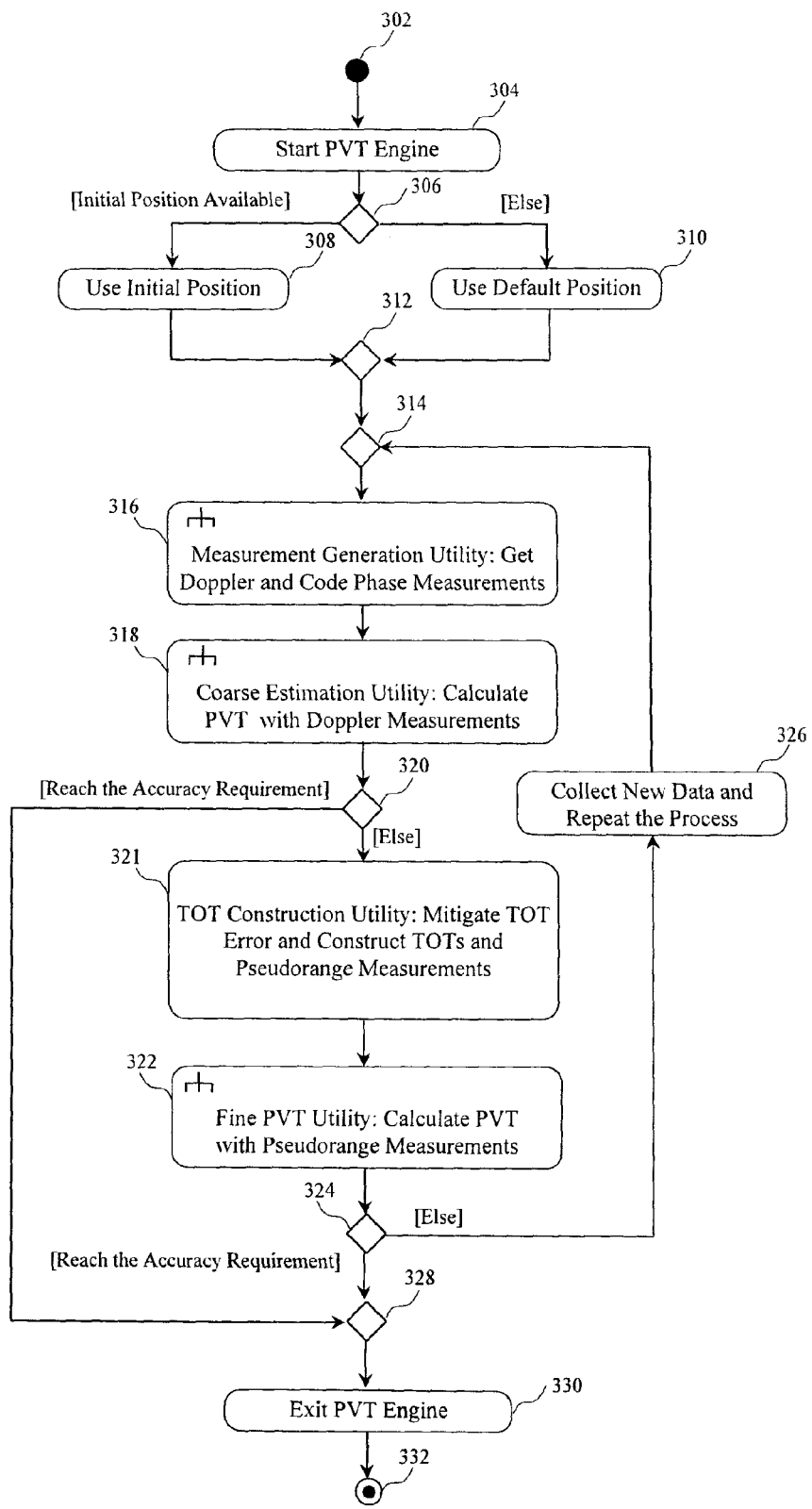
FIG. 3  PVT Engine

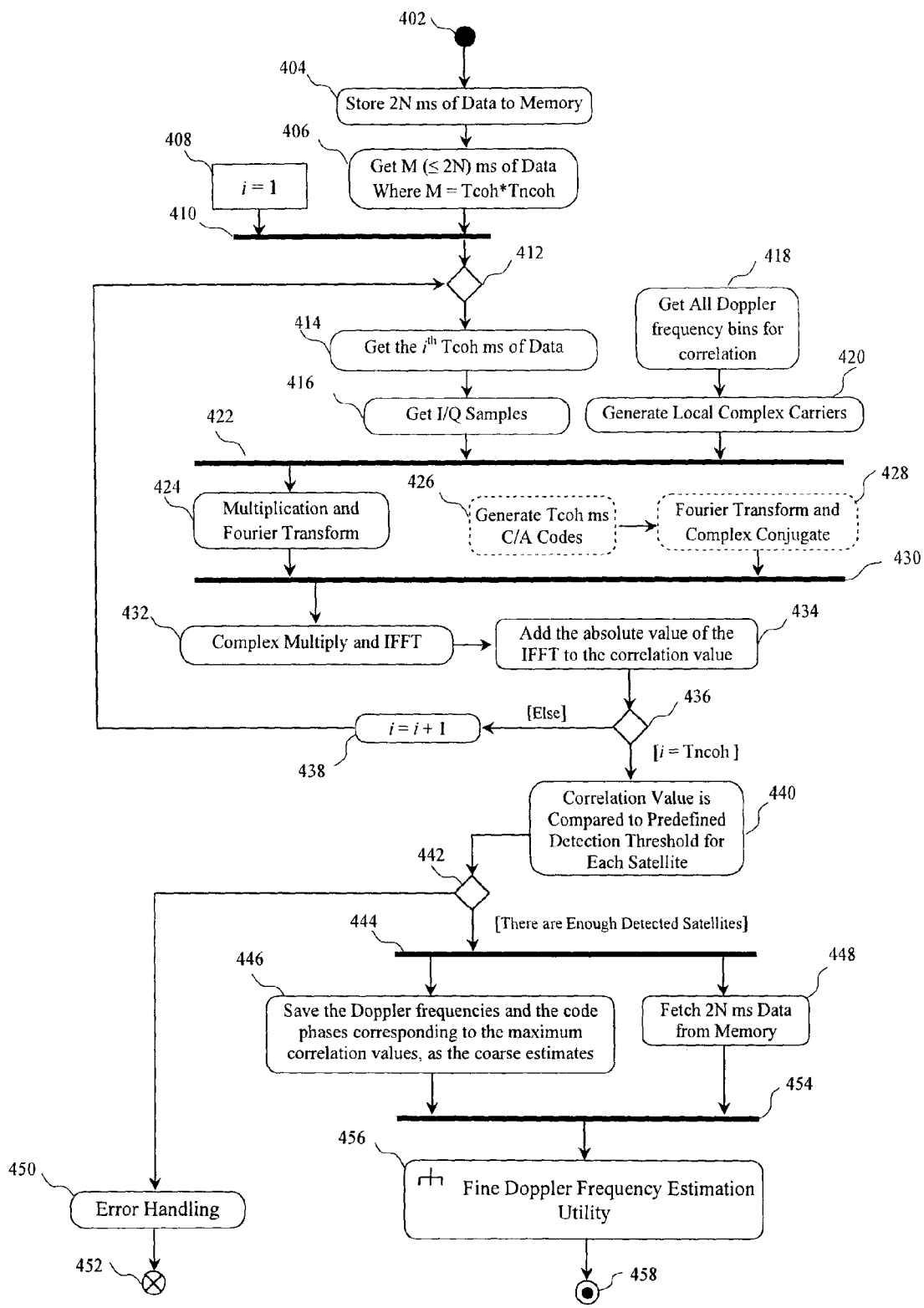
FIG. 4 Detection and Coarse Measurement Generation Utility

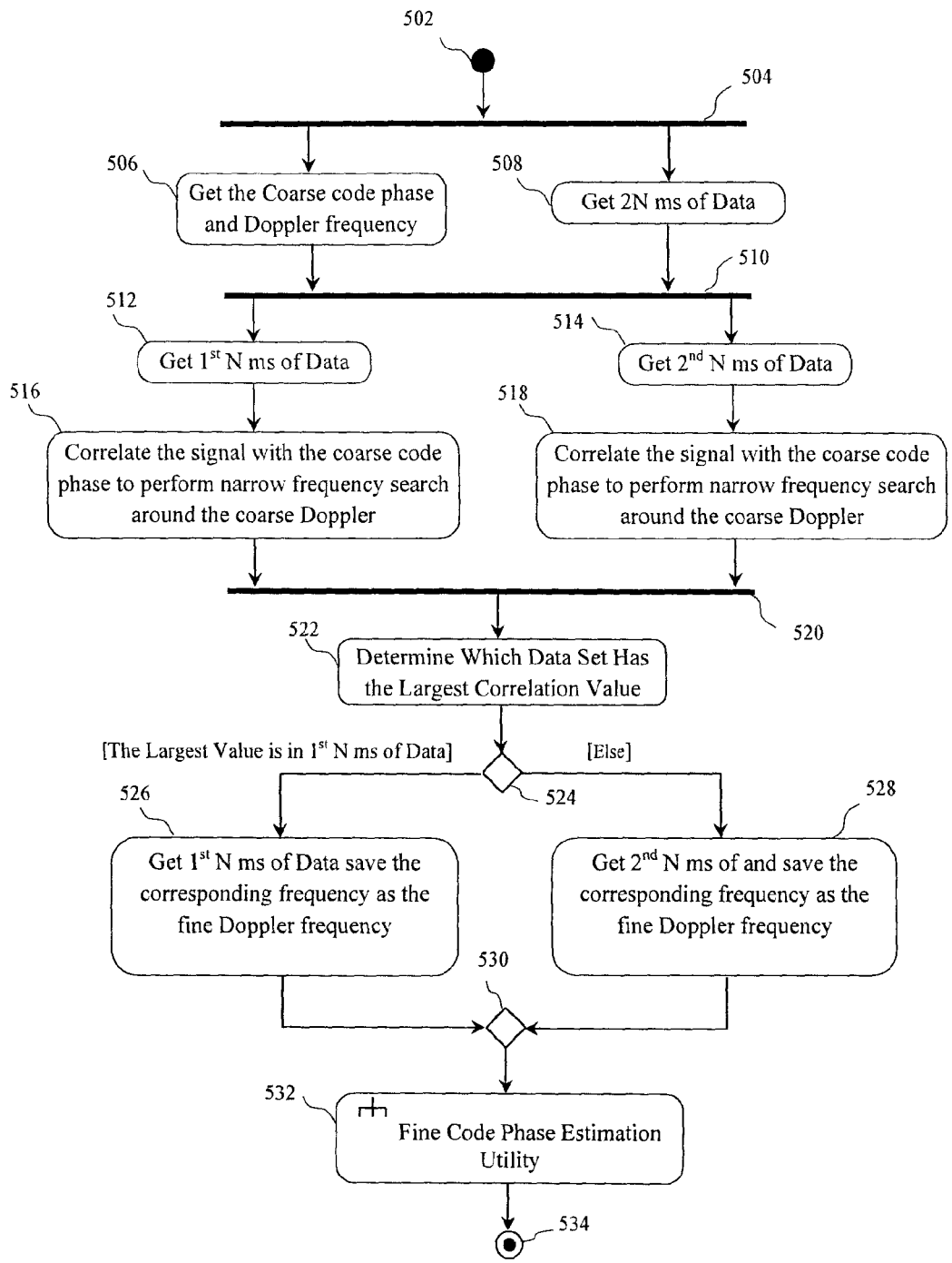
FIG. 5 Fine Doppler Frequency Estimation Utility

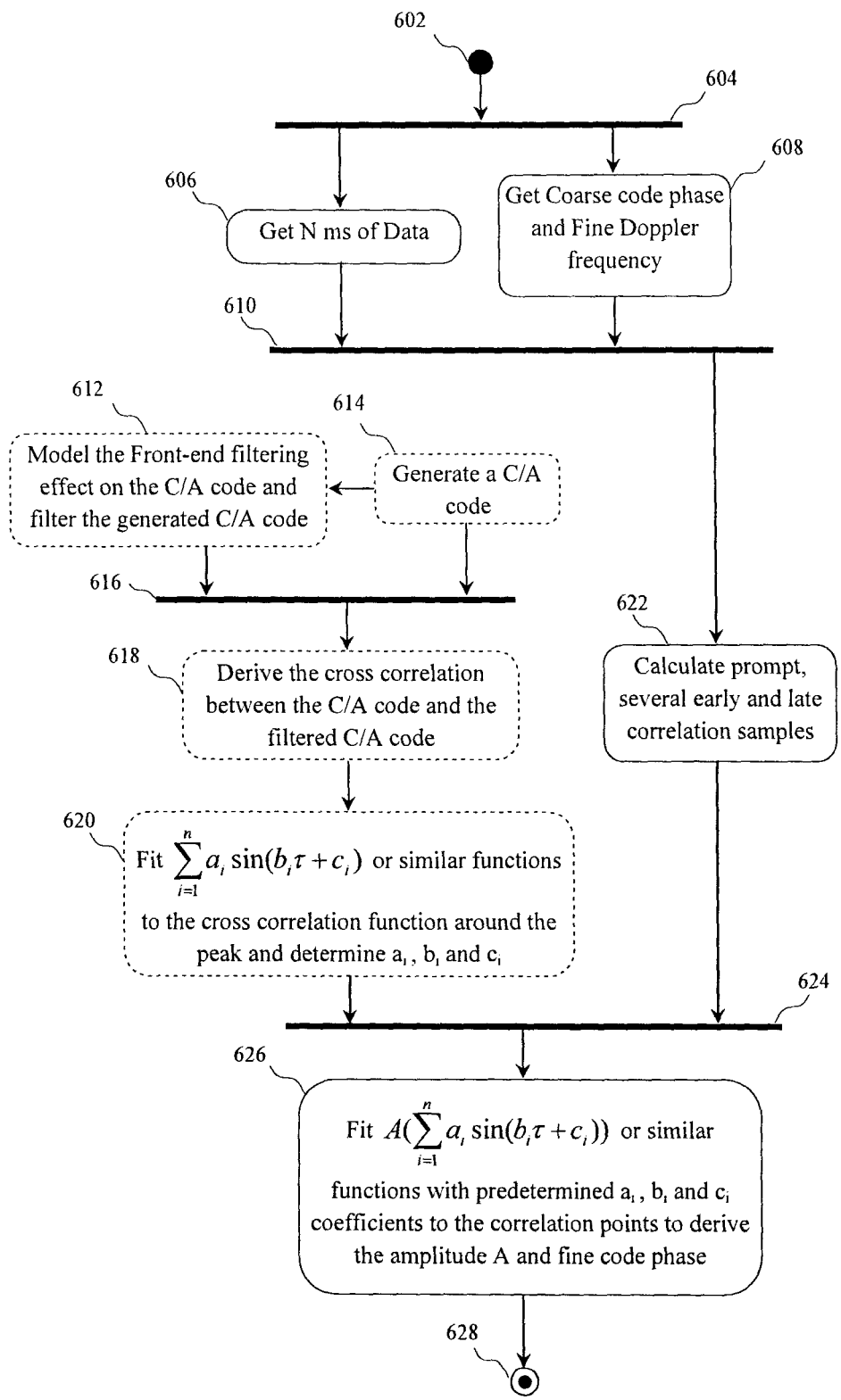
FIG. 6   Fine Code Phase Estimation Utility

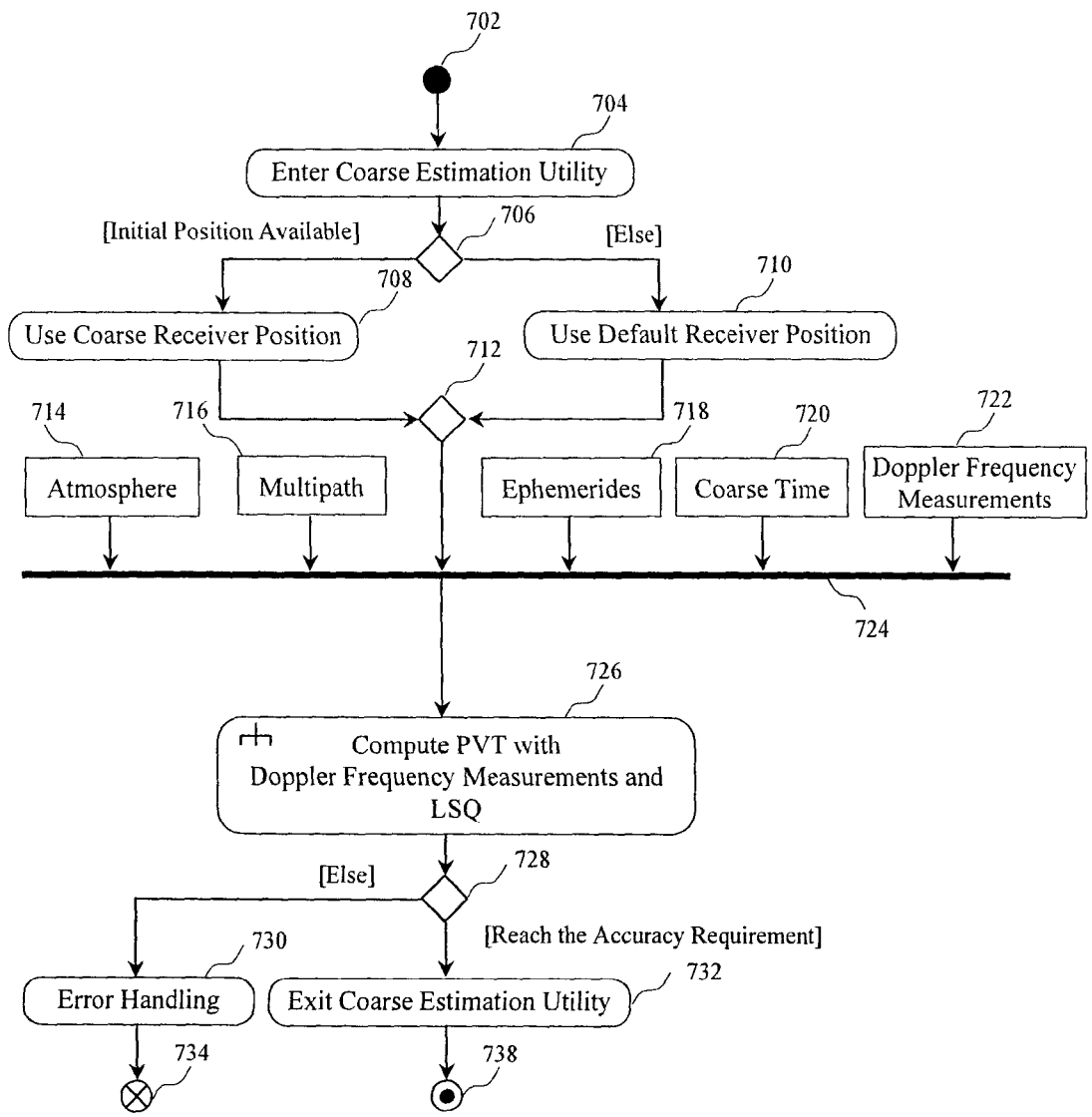
FIG. 7  Coarse Estimation Utility

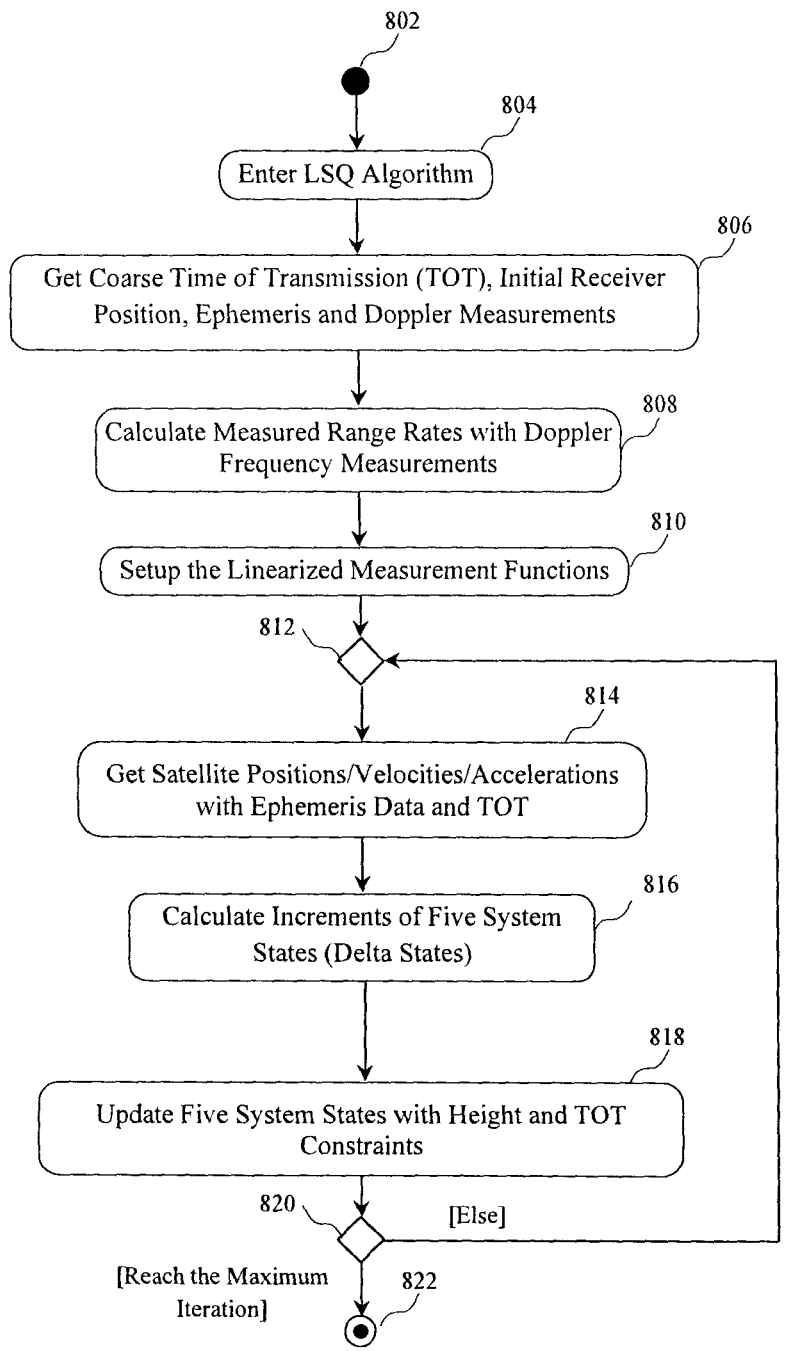
FIG. 8  Compute PVT from Doppler Frequency Measurements and LSQ

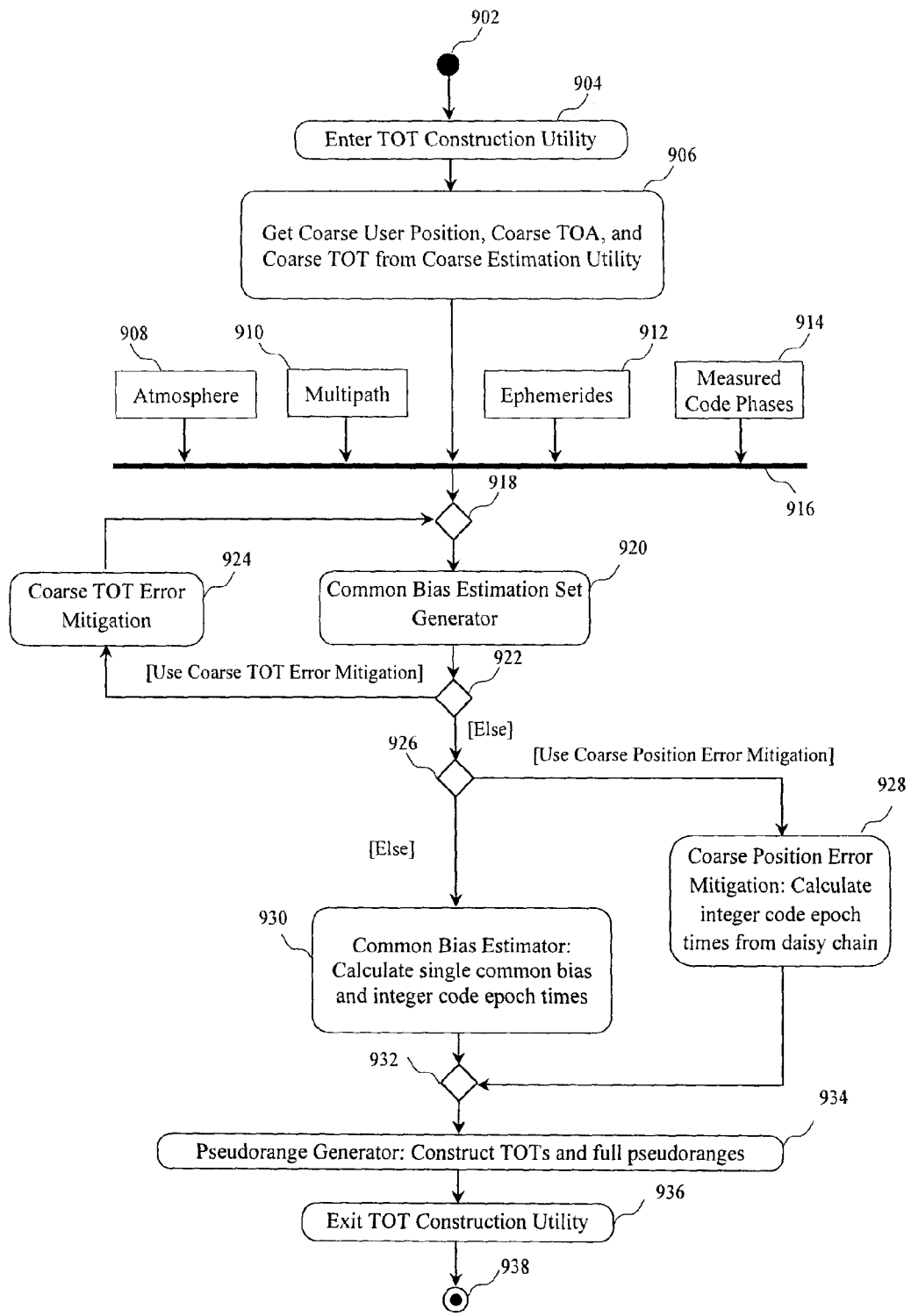
FIG. 9    TOT Construction Utility

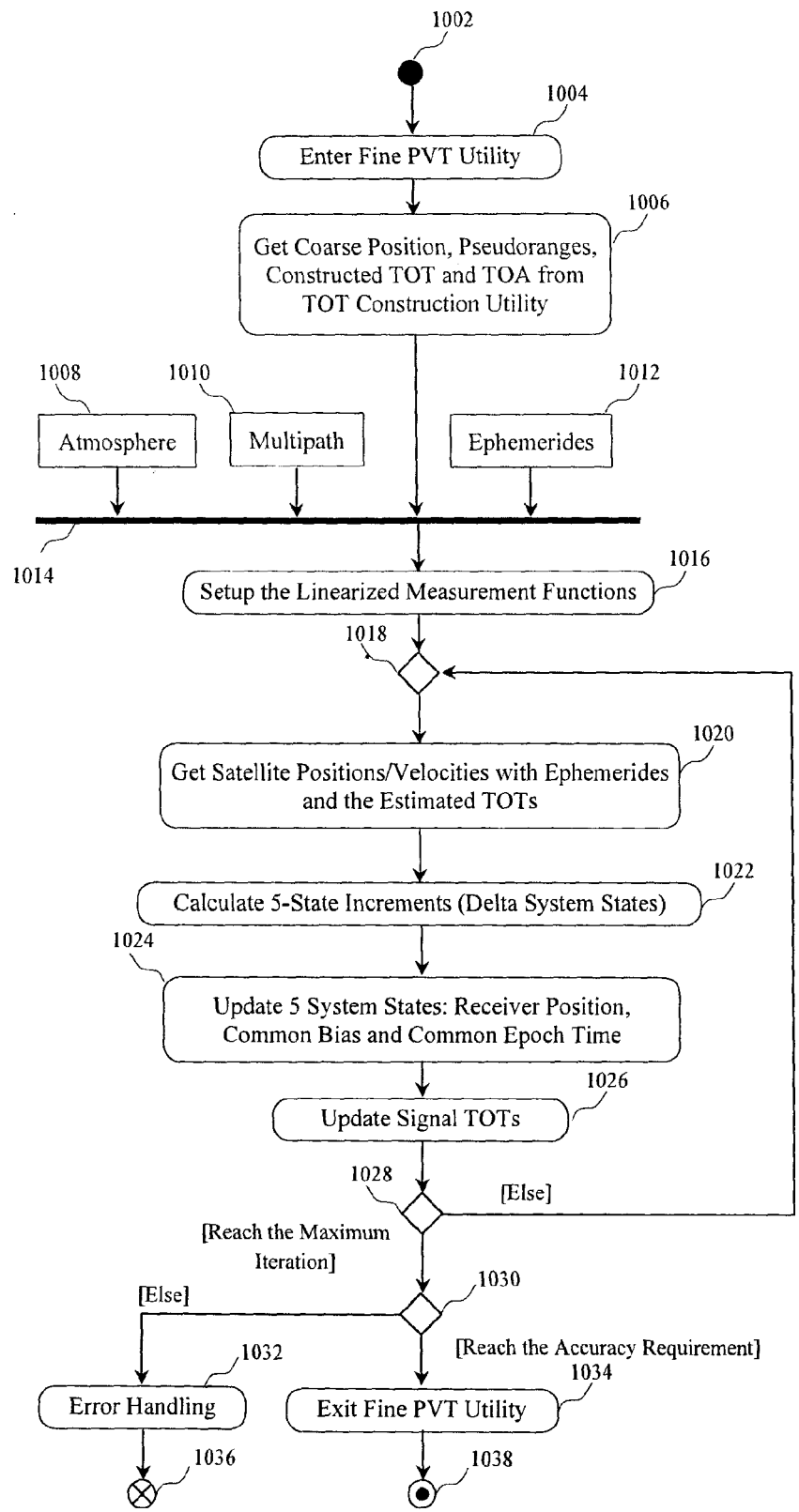
FIG. 10 Fine PVT Utility

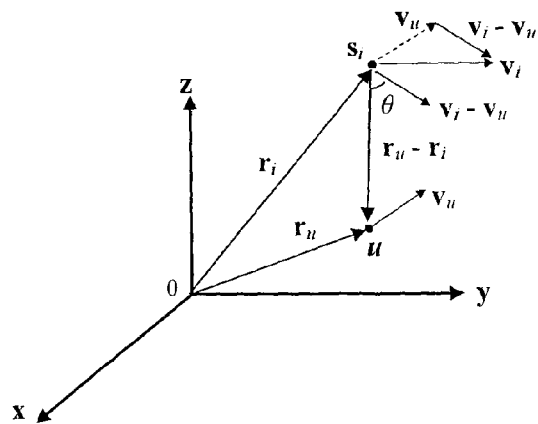
FIG.11 Vectors in Cartesian Coordinate System
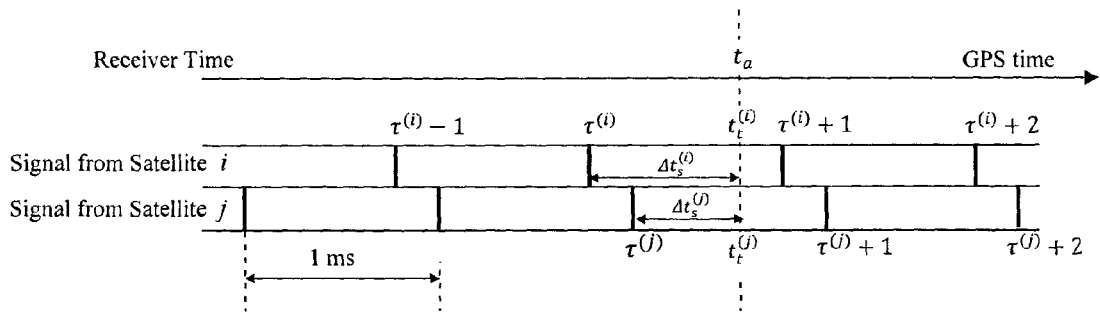
FIG. 12 TOT, Code Epoch Time, and Fractional Code Phase Time

SYSTEM, METHOD, AND COMPUTER PROGRAM FOR A LOW POWER AND LOW COST GNSS RECEIVER

CROSS-REFERENCE TO RELATED APPLICATIONS

This application claims the benefit of U.S. Provisional Application No. 61/513,149 filed Jul. 29, 2011, the entirety of which is incorporated herein by reference.

FIELD

The present disclosure relates to global navigation satellite system (GNSS) receivers. The present disclosure more specifically relates to a GNSS receiver that is operable to provide an ultra-fast, autonomous and reliable position fix that does not require an initial position while minimizing processing power and hardware cost.

BACKGROUND

GNSS techniques are used to determine one or more of position, velocity, and time (PVT) of a GNSS receiver. GNSS includes the Global Positioning System (GPS) of the United States, the GLONASS system of Russia, the GALILEO system of European Union, the BEIDOU/COMPASS system of China and any other similar satellite systems. GNSS technology has become mainstream for consumer electronics over the past few years. Products such as GPS enabled smart phones and Personal Navigation Devices (PND) are wildly popular and very affordable. As the demand for GNSS technology expands into new positioning applications, GNSS receiver designs struggle to meet the requirements that many of these applications have for low cost, very low power consumption, and extremely fast time to first fix (TTFF). These devices may need to operate in challenging environments where traditional receivers suffer degraded performance or even complete failure.

U.S. Pat. No. 7,133,772 to Global Locate Inc. discloses a method and apparatus for locating position of GPS receiver without decoding the time tag from satellite navigation data, where an accurate absolute time is obtained from a wireless communication system. Thus the system needs to be connected to the wireless communication system in order to operate. As such, the system cannot be operated autonomously.

U.S. Pat. No. 6,417,801 to Global Locate Inc. discloses a method and apparatus for computing GPS receiver position without decoding the time tag from satellite navigation data and without accurate absolute time. When operating autonomously and an a-priori estimate of position is not known, the method of "grid-search" assumes an a-priori position and tests the a-posteriori residuals from least squares to confirm if the solution is valid, repeating this process until a valid solution is found. Thus, additional processing power is needed as the least squares process is repeated. Further, as an a-posteriori residual test requires redundant measurements, the method cannot be used when there is a minimum set of measurements available.

There is a need, therefore, to provide an implementable GNSS receiver system that is operable to provide a fast, autonomous and reliable TTFF that does not require an initial position, and at the same time, reducing processing power and hardware cost.

SUMMARY

The present disclosure relates to a system, method and computer program for an advanced global navigation satellite system (GNSS) receiver that is operable to provide ultra-fast time to first fix (TTFF) in comparison to the prior art and consume low power.

The present disclosure also describes a system for determining one or more of position, velocity, and time (PVT) from GNSS signal samples. The system comprises: (a) a GNSS Sample Obtaining Means for obtaining in-phase and/or quadrature (I/Q) samples of signals from one or more GNSS satellites; (b) a Clock Obtaining Means for obtaining an initial estimated time of arrival (TOA) of the I/Q samples; a Parameter Obtaining Means for obtaining satellite ephemeris data, which includes satellite orbit and clock information of the one or more GNSS satellites; and (c) a PVT Engine to provide the PVT of the receiver.

The PVT Engine comprises: (i) a Measurement Generation Utility to compute Doppler frequency measurements and code phase measurements of the one or more GNSS from the I/Q samples; (ii) a Coarse Estimation Utility to estimate a coarse PVT, coarse TOA, and coarse satellite signal times of transmission (TOT) from the Doppler frequency measurements, the initial TOA, the satellite ephemeris data; (iii) a TOT Construction Utility to determine refined TOTs relative to the coarse TOA and generate full pseudorange measurements by determining integer code epoch times from the code phase measurements, the coarse PVT, the coarse TOTs, and the satellite ephemeris data; and (iv) a Fine PVT Utility to calculate fine PVT from the code phase measurements, the coarse PVT, the coarse TOA, the refined TOTs, and the satellite ephemeris data.

In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 illustrates a system in accordance with an embodiment.

FIG. 2 is a block diagram of the hardware architecture in accordance with an embodiment.

FIG. 3 illustrates a method for obtaining PVT in accordance with an embodiment.

FIG. 4 illustrates the Detection and Coarse Measurement Generation Utility in accordance with an embodiment.

FIG. 5 illustrates the Fine Doppler Frequency Estimation Utility in accordance with an embodiment.

FIG. 6 illustrates the Fine Code Phase Estimation Utility in accordance with an embodiment.

FIG. 7 illustrates the Coarse Estimation Utility in accordance with an embodiment.

FIG. 8 illustrates the Least Squares (LSQ) Process for PVT from Doppler Measurements in accordance with an embodiment.

FIG. 9 illustrates the TOT construction process in accordance with an embodiment.

FIG. 10 illustrates a procedure in which the Fine PVT Utility determines the fine PVT in accordance with an embodiment.

FIG. 11 illustrates the relationship of position and velocity vectors in a Cartesian coordinate system in accordance with an embodiment.

FIG. 12 illustrates the relationship between the TOT, the code epoch time, and the fractional code phase time in accordance with an embodiment.

DETAILED DESCRIPTION

The present disclosure relates to a system, method and computer program for a GNSS receiver that is operable to provide an ultra-fast, autonomous and reliable time to first fix (TTFF) that does not require an initial position while minimizing processing power and hardware cost. The system and method is operable without requiring the decoding of any navigation data from GNSS signals, without requiring a live connection to a communications network and without a grid-search. As such, the system and method is operable using short millisecond-range signal sample lengths. Therefore, the system consumes low power and provides an ultra-fast TTFF in comparison to the prior art.

The following describes utilizing GPS signals for PVT determination. However, it should be understood that analogous techniques may be utilized for other GNSS, and the specifics of the GPS signal structure should not be considered limiting.

Traditional GPS receivers comprise a radio frequency circuitry (RF circuitry) and a dedicated baseband processor to acquire, extract, down-convert, and demodulate navigation signals from one or more GPS satellites. The computations required to compute PVT may be performed on the dedicated processor component or on a separate general purpose processor.

Each satellite transmits a signal which provides the receiver with the information needed to calculate the time the signal was broadcast and the position and velocity of the satellite at that time. With this known information, traditional GPS receivers normally determine PVT by computing transit time of the signals transmitted from not-less-than 4 GPS satellites. When the transit times are multiplied by the speed of light, they represent a distance to each satellite, known as the pseudorange. Since the receiver may not have precise knowledge of absolute GPS time, the transit times and pseudoranges will be in error by a constant receiver clock bias that is calculated and corrected for as part of the PVT solution.

The purpose of acquisition is to identify all satellites visible to the receiver. If a satellite is visible to the receiver, the receiver must determine its frequency and code phase. The code phase denotes the point in the current data block where the coarse acquisition (C/A) code begins. The C/A code is a pseudo-random noise (PRN) sequence that identifies the transmitting satellite and repeats itself once every millisecond.

Traditional receivers require real-time navigation message data from the satellites in order to compute PVT. When the signal is properly tracked, the C/A code and the carrier wave are removed, leaving only the navigation message data bits. One GPS navigation message frame lasts for 30 seconds, hence, it will take no less than 30 seconds of tracking the signal to obtain a complete GPS navigation message frame.

The navigation data from each satellite includes the ephemeris and clock parameters, from which the receiver can calculate the position and velocity of that satellite. The navigation data also includes a highly accurate time tag in the form of a week number and a time of week (TOW) parameter which refers to the GPS time that a specific data bit transition is modulated on the signal. Longer decoding of the navigation data provides almanac parameters for all GPS satellites and atmospheric correction parameters.

Since the PRN code repeats every millisecond, the time of transmission (TOT) of any part of the signal can be determined from the TOW and the number of PRN code epochs that have been received since the TOW. Whenever the PRN code resets to a zero code phase, the TOT will be an integer when expressed as milliseconds. Otherwise, the code phase measurement represents the fractional millisecond portion of the TOT. Similarly, the code phase can be treated as the residual of the pseudorange measurement modulo one light-millisecond. Note that the TOT will be relative to the satellite clock. The satellite clock parameters from the navigation data must be used to correct the TOT to absolute GPS time.

The pseudorange may then be constructed as (TOA-TOT)*C, where TOA is the time of arrival of the signal at the receiver and c is the speed of light. If the receiver does not have knowledge of TOA at start-up, TOA may be estimated relative to one or more values of TOT plus some nominal offset. The error on the TOA will be on the order of tens of ms and represents the initial receiver clock bias.

As GNSS technology becomes incorporated into more electronic devices requiring location based services (LBS), traditional GNSS receiver techniques have several challenges to overcome to meet the requirements of many of these devices. The dedicated baseband processor incurs significant costs for development, components, and manufacturing. The processor is difficult to upgrade, increases power consumption, and takes up valuable real estate on the printed circuit board.

Furthermore, the process of searching for and acquiring GPS signals, reading the navigation data from multiple satellites and computing the location of the receiver from this data is time and power consuming, often requiring from tens of seconds to several minutes for "Cold Start". While the GPS subsystem is turned on, it consumes a significant amount of energy that is typically provided from a small battery.

When the conventional technique is used to determine a position, the TOT for a satellite must be determined from the decoded navigation message in order to construct the full pseudorange from the code phase. Until the time tag is determined, the measured pseudorange is ambiguous since only the modulo 1 ms portion is known. Under certain operating environments (such as forests or urban canyons) where the signal is blocked intermittently and/or the signal is weak, it is difficult or often impossible for standard GPS receivers to maintain lock and decode the navigation message to determine the time tag. As a result, positioning solutions cannot be computed. In many cases, this lengthy processing time makes it impractical or unsuitable for certain applications.

Software based GNSS receivers have been developed as an evolutionary step in the development of modern GNSS receivers. Instead of using a dedicated baseband processor, software-based GNSS receiver technologies (also known as Software-Defined Radio or SDR) employ only the RF circuitry to provide in-phase and/or quadrature (I/Q) samples with an in-phase component, a quadrature component, or both. The RF circuitry may comprise (i) a radio frequency (RF) Front-end, (ii) a radio frequency integrated circuit (RFIC) or (iii) anything that can provide I/Q samples. Further signal processing and computation is performed on a general purpose processor such as a central processing unit (CPU) or digital signal processor (DSP). The idea is to position the processor as close to an antenna as is convenient, transfer received I/Q samples into a programmable element and apply digital signal processing techniques to generate measurements and calculate the receiver position.

Since the dedicated baseband processor is absent in software based GNSS receivers, they have advantages over traditional, hardware based receivers. For example, in the near future some GNSS protocols will have a number of additional signals that can be utilized for enhanced availability and performance. Typically, software receivers only need software upgrades to allow for the inclusion of the new signal processing, while users of Application Specific Integrated Circuit (ASIC) based receivers will have to purchase new hardware components to access these new signals. Other benefits of software based GPS receivers include rapid development time, cost efficiency and notable flexibility.

If the processing is performed on an existing processor in the host device, software based GNSS receivers can be integrated into the host system with greater ease and use significantly fewer resources. Even further benefits can be realized if the host device does not require PVT to be computed on board and the I/Q samples can be stored for later use or be transmitted for processing on an external server.

However, the problem with the traditional software GPS receiver processing methodology is that it requires a significant amount of I/Q samples transferred to the processor to compute a receiver position. Due to the intensive data processing, CPU loads can be increased significantly which, in turn, may rapidly deplete the battery life of a portable device. As a result, traditional software-based GPS receiver methodology is typically not suitable for modern miniaturized portable electronics.

Snapshot receiver technology provides new measures to reduce the power consumption and TTFF while enhancing the availability in weak signal scenarios. Snapshot receivers utilize the fractional pseudorange measurements (i.e. the fine code phases) determined by interpolating the correlation outputs of the acquisition engine directly, and then reconstruct the full pseudorange by the assistance of the initial position and satellites ephemerides.

By obtaining only a small fraction of a second of I/Q samples and enabling the system only when a position fix is needed, the processing loads in a software GPS receiver can be drastically reduced using snapshot techniques. When a position fix is not needed, the GPS functionality may be disabled. By using the shortest sample lengths practical, power consumption is minimized.

Tracking loops cannot typically be used for snapshot receivers because the sample data length is usually much shorter than the convergence time of the tracking loops. As such, other fine estimation techniques must be used.

Since a snapshot receiver does not continuously track the satellite signals, it is unable to decode the real-time navigation message data. Thus the satellite ephemeris, clock corrections, time tag, and other information must be obtained by other means. However, since the TOTs of the currently received signals are constantly changing, they cannot be directly provided by an external source. Without knowing the TOTs, the estimated pseudoranges are ambiguous. To solve this problem, some receivers require a prior knowledge of an initial position to help the algorithm to resolve the ambiguity.

Assisted GPS (AGPS) technology is sometimes employed to obtain the navigation data, or equivalent information, from a communications network when decoding the real-time satellite signal is impossible or inconvenient. It is typically used for cellular devices that are capable of downloading the required data from a cellular network. However, an AGPS receiver must be connected to the AGPS network in order to operate. As such, the receiver cannot be operated autonomously. Privacy concerns as well as locations where AGPS service is unavailable remain a problem that yet needs to be addressed.

Another known technique to obtain the navigation data or equivalent is to utilize predicted parameters from data stored in memory. This data may be loaded onto the device several days before it is needed.

Regardless of what method is used to obtain the navigation data without decoding it from the satellite signals, the TOTs of the currently received signals cannot be directly obtained in this way. The GPS receiver must still decode enough navigation data to retrieve the time tags, so several seconds may be needed to construct full pseudorange measurements and calculate a position fix. In a snapshot receiver, the code phase may yield fractional pseudorange measurements, but they will be ambiguous without some other method to reliably construct full pseudoranges.

If a snapshot GNSS receiver is able to reliably recover the TOTs of the received signals, it may be operable with sample lengths on the order of milliseconds. With enhanced acquisition and measurement generation, sample lengths may be shortened even further. Such short sample lengths may be utilized by a software receiver without excessive processing load, precluding the need for the power and cost of a dedicated processor. If the receiver is able to operate autonomously, the power and cost of a live connection to a communication network is also eliminated.

1. Overview

As will be explained in further detail below, the inventors have discovered that using sample lengths as short as 2 ms allows a snapshot GNSS receiver to operate with very low power and compute a position very quickly. Because the navigation data cannot be decoded from the satellite signals with such a short sample length, the receiver cannot obtain the satellite ephemeris data or the time tag with conventional methods. Further, the sample length may be far less than the convergence time required to employ tracking loops, demanding other fine estimation techniques.

In accordance with the present system and method, a PVT Engine, a GNSS Sample Obtaining Means, a Clock Obtaining Means, and a Parameter Obtaining Means are provided for acquiring satellite signals and calculating a PVT solution. With the present system and method, with as little as 2 ms of data, it is possible to obtain a valid position at meter-level accuracy very quickly. In an embodiment, the PVT Engine processes I/Q samples of GNSS signals to generate measurements associated with an initial estimated time of arrival (TOA) derived from the Clock Obtaining Means. The PVT Engine then computes the snapshot GNSS receiver position from the measurements and satellite ephemeris data from the Parameter Obtaining Means. With application of the present system and method, the overall power consumption of the PVT Engine, the GNSS Sample Obtaining Means, the Clock Obtaining Means and the Parameter Obtaining Means is extremely low or negligible, and is therefore implementable to low power electronic devices as well as common commercially available GNSS receiver designs.

In an embodiment, the system may comprise a Parameter Obtaining Means, a Clock Obtaining Means and a PVT Engine. The Parameter Obtaining Means may obtain satellite ephemeris data of one or more GNSS satellites. The Clock Obtaining Means may obtain a clock for estimating a coarse GNSS time. The PVT Engine may be linkable to a signal interface that is operable to provide I/Q samples from a GNSS antenna. The PVT Engine may comprise a Measurement Generation Utility, a Coarse Estimation Utility, a TOT Construction Utility and a Fine PVT Utility.

In an embodiment, the Measurement Generation Utility may compute the Doppler frequency and the code phase of the one or more GNSS satellites based on the I/Q samples.

The Coarse Estimation Utility may determine a coarse position and an initial TOT based on Doppler frequency measurements, the satellite almanac/ephemeris data and the coarse GNSS time. The TOT Construction Utility may provide an improved TOT to the Fine PVT Utility by reducing the error of the coarse TOT from the Coarse Estimation Utility. The constructed TOT may be used to generate full pseudorange measurements. The Fine PVT Utility may determine a fine position and a fine GNSS time based on the coarse position, pseudorange measurements, the satellite ephemeris data, and the constructed TOT.

The following description discusses the implementation of an embodiment of the present system and method for a GPS system. However, it should be understood that the present system and method is readily implementable to other GNSS systems such as the GLONASS system of Russia, the GALILEO system of European Union, the BEIDOU/COMPASS system of China, and positioning systems which utilize pseudolites or a combination of satellites and pseudolites, and any other similar systems in which a plurality of satellites, and/or pseudolites, and/or other type of transmitters, have known accurate reference frequencies. By definition, pseudolites are ground-based transmitters which broadcast a PRN code (similar to a GPS signal) modulated on a L-band carrier signal, generally synchronized with GPS time.

FIG. 1 illustrates a system in accordance with an embodiment. The system may comprise a PVT Engine 1 linkable to a signal interface 3 and/or to a storage means 2, which may be further linked to RF circuitry 5 and GPS antenna 7. The RF circuitry 5 may be operable to provide down-converting, signal conditioning/filtering, automatic gain controlling and analog-to-digital converting of the analog GPS satellite signals to I/Q samples. The signal interface 3, which may for example be a USB interface, may transfer I/Q samples to the PVT Engine 1. The PVT Engine 1 may receive I/Q samples from the RF circuitry 5 via the signal interface 3 and/or the storage means 2. I/Q samples may also be passed between the signal interface 3 and the storage means 2. In addition, the Parameter Obtaining Means 4 may provide the PVT Engine 1 with satellite ephemerides, for example by download or predictive techniques, including satellite ephemeris and clock corrections. The Clock Obtaining Means 6 may provide the PVT Engine 1 with a clock for estimating a coarse TOT of GNSS signals.

The system may also be implemented as a distributed computing system, for example comprising a client device linked by a network to a server device wherein the server device may provide processing functionality. If the position is processed at the server device, very little bandwidth may be required between the client device and server device as the PVT Engine requires very few I/Q samples.

Any function of the PVT Engine may be implemented in a client device or a server device. The server device may provide processing for one or more client devices.

The PVT Engine 1 in FIG. 1 may comprise (i) a Measurement Generation Utility (ii) a Coarse Estimation Utility (iii) a TOT Construction Utility and (iv) a Fine PVT Utility. The accuracy of the position generated by the Coarse Estimation Utility and the Fine PVT Utility will be assessed. The PVT Engine will end once the accuracy of the position meets the specified position accuracy requirements.

The Measurement Generation Utility may generate raw measurements that include both the Doppler frequency and the code phase measurements with as little as 2 ms of I/Q samples. The code phase denotes the time interval between the beginning of I/Q samples and the beginning of the first complete PRN code.

FIG. 2 is a block diagram of the hardware architecture in accordance with an embodiment. The system may comprise a GPS antenna 10 linkable to a signal down converter 11 which converts the RF signals to Immediate Frequency (IF) band. The signals are passed to an Analog-to-Digital Converter (ADC) 12, and then saved to Random Access Memory (RAM) 13 coupled to a DSP/Microcontroller 17 for processing to get PVT solutions. The firmware, which includes the algorithm for processing, is stored at non-volatile memory such as Read-Only Memory/Erasable Programmable Read-Only Memory (ROM/EPROM) 14. A Frequency Synthesizer 15 provides the clock and synchronization mechanism for the system, and a Power Supply 16, which may include a battery pack or an Alternating Current (AC) adapter, to supply power to all components of the system.

FIG. 3 illustrates a method for obtaining PVT in accordance with an embodiment. The PVT Engine begins at the Start-Point 302 and enters the engine at 304. At Decision 306, if the initial receiver position is available, the initial receiver position 308 will be sent through Merge 312 and 314. Otherwise, the default receiver position 310 (for example, the center of the Earth) will be sent through Merge 312 and 314. Then, the engine will start the Measurement Generation Utility to get the Doppler and code phase measurements, as shown at action 316. The "rake" symbol, which represents a hierarchy, indicates that action 316 can be expanded into another UML activity diagram. After the measurements are available, the engine will call the Coarse Estimation Utility 318 to calculate PVT based on the Doppler measurements. Once PVT is available, its accuracy will be assessed at Decision 320. If its accuracy has already met the requirement, the engine may end as shown at Merge 328, Action 330 of the exit operation and End-Point 332. For all other cases, the engine will call the TOT Construction Utility 321 to mitigate the error of TOT provided by the Coarse PVT Utility and construct TOTs for all visible satellites and generate full pseudorange measurements. Then, the engine calls the Fine PVT Utility 322 to estimate position based on the pseudorange measurements. Once again, the position accuracy will be assessed at Decision 324, if its accuracy has met the requirement; the engine may end as shown at Merge 328, Action 330 of the exit operation and End-Point 332. For all other cases, the engine will discard the current collected I/Q data, collect new data, and restart the process, as shown at 326. The new data will be passed to action 316 for processing via Merge 314, and the process goes on until the position accuracy meets the requirement. Once the position accuracy meets the requirement, the engine will stop and exit at the End-Point 332.

The PVT Engine may operate in real time or near real time or may be further linked to a storage means which could, for example, enable a post-processing mode for static, low-dynamic and high-dynamic applications. The PVT Engine can also be realized if the host device does not require PVT to be computed on board and the I/Q samples can be stored for later use or be transmitted for processing on an external server. It should be noted that the PVT Engine does not require "always-on" access as required by AGPS.

The I/Q samples may be obtained from: (a) a tracking loop of any GNSS satellite signal receiver (hardware or software based); (b) a GNSS RFIC; (c) a GNSS RF front-end; (d) direct RF sampling using an ADC; or (e) any other means by which to obtain the I/Q samples.

As previously mentioned, a traditional GPS receiver requires about 30 seconds to acquire the ephemeris by receiving and decoding a navigation message. The PVT Engine only needs to collect as little as 2 ms, and it does not need to decode the navigation message. Satellite ephemeris data normally decoded from the navigation message may be obtained from other sources. These ephemeris data include: almanac/ephemeris parameters; satellite clock corrections; atmospheric models/corrections; and other information necessary or desirable for position determination. For example, precise almanac/ephemeris (satellite orbit and clock parameters) are available as free downloads at public sources such as IGS and NGS web sites. Alternatively, predictive satellite almanac/ephemeris algorithms may be provided to enable autonomous receiver operation. Satellite positions and clock errors may be determined by the almanac. Atmospheric corrections may be downloaded at public sources such as IGS and NGS web sites or can be modeled by other means.

Since an accurate TOT may not be obtained without decoding the navigation message, the PVT Engine estimates the accurate TOT by using the fifth state variable in Doppler positioning of the Coarse Estimation Utility and pseudorange positioning of the Fine PVT Utility. Thus there is no need for the PVT Engine to receive and decode the navigation message. The PVT Engine may use a snapshot of I/Q samples to obtain the GNSS receiver position.

2. Measurement Generation Utility

The present system and method may employ a Measurement Generation Utility to compute the Doppler frequency and the code phase for one or more GNSS satellites based on I/Q samples.

Availability, reliability and accuracy of GNSS receivers depend largely on the quality of the measurements. For typical GNSS receivers, precise pseudorange and carrier phase measurements can be derived from the tracking loops once the bit and subframe are successfully synchronized. Stable tracking also ensures correct decoding of ephemeris which provides various parameters of the satellites.

Tracking loops cannot typically be used for snapshot receivers because the sample data length is usually much shorter than the convergence time, so other fine estimation techniques must be used instead. Since the accuracy of the initial Doppler and the code phase is too poor for positioning purposes, a novel multistage detection/estimation scheme with variable data lengths is presented herein. This scheme comprises a Detection and Coarse Measurement Generation Utility, Fine Doppler Frequency Estimation Utility and Fine Code Phase Estimation Utility.

The detection stage is relatively the most computationally intense as it has to detect all satellites in view and derive the coarse Doppler and code phase for each. The Doppler and code phase estimates at this stage are not required to be accurate for positioning, only a rough estimate will suffice. Contrary to conventional snapshot receiver designs, a technique that minimizes processing and energy used is presented herein to use only M ms of a 2N ms I/Q sample data for satellites detection (where M ms≤2N ms). The entire 2N ms of sample data will be used at a later stage to derive better estimates of the Doppler frequencies and code phases of the visible satellites. The value of M is determined by the desired detection performance and the signal condition that the receiver is operating in.

The Detection and Coarse Measurement Generation Utility may use conventional coherent and non-coherent integration to increase the signal processing gain to detect the satellites. Instead of non-coherent integration, differential detection techniques could also be used to reduce the squaring loss resulting from the non-coherent operation.

For GPS, navigation data message is modulated on the C/A code using binary phase shift keying (BPSK) at a rate of 50 bit per second or 20 ms per bit. Navigation data bit transition can cause phase reversal during the coherent integration, as a result, it may negate the desired effects of extended integration as well as degrading the accuracy of the Doppler frequency estimation. In order to overcome this problem, one option for conventional snapshot receivers is to collect 10 ms of data first and then another 10 ms of data right after it with no time gap in between to guarantee at least one of the 10 ms data blocks is outside of a navigation data bit transition. Each of the 10 ms data samples will be used to determine the Doppler frequency measurements and code phase measurements independently. Dividing data at this stage is wasteful in power and resources because each 10 ms block is processed individually, and only the portion with the highest correlation value is chosen.

In the present system and method, this division is performed only at the Fine Doppler Frequency Estimation Utility which requires far less computation compared to if this was done at the Detection and Coarse Measurement Generation Utility stage, as a result, no power and resources are wasted. The Detection and Coarse Measurement Generation Utility overcomes the presence of navigation data bit transition by utilizing non-coherent integrations or using differential detection techniques since only a rough Doppler frequency estimate is required which can also be refined later. As a result, the Detection and Coarse Measurement Generation Utility uses the entire data length without dividing which ultimately increases the signal processing gain. Although other techniques for detecting the navigation data bit transitions prior to tracking loop bit synchronization are available, most techniques fail to perform under adverse signal conditions.

After the Detection and Coarse Measurement Generation Utility, all visible satellites and their corresponding coarse Doppler frequencies and code phases will be passed to the Fine Doppler Frequency Estimation Utility where the fine Doppler frequency is derived and the portion of the data that is free of navigation data bit transition is determined and passed to the Fine Code Phase Estimation Utility to derive the code phase measurements.

In the following each section is described in more detail.

2.1 Detection and Coarse Measurement Generation Utility

This utility comprises coherent and non-coherent integration to detect the visible satellites and estimate the coarse Doppler frequencies and code phases. The general architecture of a software based acquisition unit typically tests the time domain code phase ambiguity in parallel using a single Fast Fourier Transform (FFT) algorithm running on a microprocessor. Hardware based architecture usually have multiple correlators that are dedicated to designated Doppler frequency and code phase bins. The FFT method is well established in several prior arts and is not repeated herein.

Acquisition search is repeated until a correlation value in one Doppler frequency or code phase bin is greater than a predefined detection threshold. The predefined detection threshold is a function of the signal noise floor and the required detection statistics which partially determine a receiver's acquisition performance. Although extending the coherent integration time is ideal for improving sensitivity, such methods however are restricted by factors including data message ambiguity, increased power loss due to frequency errors, and a rapid increase in signal acquisition times. As a result, coherent integration cannot be increased indefinitely. To increase the processing gain without increasing the coherent integration time, non-coherent integration or hybrid differential/coherent integration can be used.

FIG. 4 illustrates an acquisition process with coherent and non-coherent integration to detect visible satellites and obtain coarse Doppler frequency measurements and coarse code phase measurements using a UML Activity Diagram. The acquisition process begins at Start-Point 402 and 2N ms of I/Q data may be stored at 404, where N may be an integer no less than one. M (≤2N) ms of this data will be obtained at 406 where M is the product of the coherent integration time Tcoh and number of the non-coherent integrations Tncoh. At 408 the non-coherent integration counter i is initialized to one and fork 410 dispatches the data and counter to merge 412. At 414, the $i^{th}$ number of Tcoh ms of data is obtained and converted to I/Q samples 416. Depending on the Doppler frequency search bandwidth and search steps, all Doppler frequency bins are obtained at 418 and local complex carriers are generated at 420. I/Q samples and local complex carriers are passed to 424 via 422 to perform multiplication and Fourier transform to remove the Doppler frequency. Other processing techniques including but not limited to sequential processing can also be used. For real-time applications, FFT and other optimization techniques may be applied to reduce CPU and memory loading to improve processing speed. Other techniques such as padding may be applied to meet the size requirement of FFT and reduction of associated computational errors.

While the generation of Tcoh ms sampled C/A codes of all satellites matching the sampling rate of the signals is performed at 426, Fourier transform and complex conjugate on the sampled C/A sequence is handled at 428. As a good practice, the sampled C/A sequence may be computed in advance and saved in non-volatile memory, thus the sampled C/A sequence will always be available and does not require additional computation at run time. The dotted boundary of 426 and 428 indicate that these activities may be performed in advance or at run time. When both the sampled C/A sequence and FFT-converted complex signals become available at joint 430, they will be processed with Complex Multiply and IFFT (Inversed Fast Fourier Transform) operations at 432. At 434 the absolute value of the IFFT is added to the correlation value. At decision 436, if the non-coherent integration counter i is less than the number of the non-coherent integrations Tncoh, the previous procedure will be repeated at 412 and the non-coherent integration counter i will be increased by one at 438.

At 440, the final correlation value is compared to a predefined detection threshold for each satellite, if it is larger than the threshold, the satellite is declared as visible. At decision 442, the number of the visible or detected satellites is checked. If there are enough detected satellites to obtain PVT solutions in the Coarse Estimation Utility and the Fine PVT Utility, the corresponding Doppler frequencies and code phases are saved as the coarse estimates at 446, otherwise, the error handling routine at 450 is called and the acquisition process is stopped at 452. A fork 444 dispatches the 2N ms data at 448 (which is already stored at 404) along with the coarse estimates at 446, to the Fine Doppler Frequency Estimation Utility at 456 via 454 and the Detection and Coarse Measurement Generation Utility reaches the End-Point 458.

2.2 Fine Doppler Frequency Estimation Utility

Fine Doppler Frequency Estimation Utility refines the coarse Doppler estimates from the previous stage by utilizing narrow frequency search space around the Doppler. Since the frequency estimation is sensitive to the possible phase reversal of the navigation data bits, the 2N ms of data is divided into two N ms sections. Each section will be correlated with the coarse code phase and locally generated carriers around the coarse Doppler frequency. The N ms section with the maximum correlation value is considered as the navigation bit transition free section and its corresponding Doppler bin is considered as the Fine Doppler frequency estimation.

FIG. 5 illustrates the Fine Doppler frequency estimation process. The process begins at Start-Point 502, 2N ms of data is obtained at 508 along with the coarse code phase and Doppler frequency at 506 via fork 504 and dispatched to join 510. The 2N ms data may be divided evenly into 2 equal sets of N ms each at 512 and 514. Narrow frequency search around the coarse Doppler and correlation with the coarse code phase is performed at 516 and 518 and results will reach join 520. Correlation value comparison is performed at 522 and at decision 524 the largest correlation value is determined. The first N ms of data or the second N ms of data is obtained at 526 or 528 respectively and the corresponding Doppler value for the largest correlation value is saved as the fine Doppler frequency estimate. The N ms data with the largest correlation value along with the fine Doppler frequency estimate is sent to the Fine Code Phase Estimation Utility 532 via 530 and the process ends at the End-Point 534.

2.3 Fine Code Phase Estimation Utility

The accuracy of fine code phase determination is critical to the positioning accuracy for a snapshot receiver. As mentioned, the convergence rate of the code tracking loop is typically not fast enough and is therefore unusable when only a few ms of sample data is available. An auto-correlation function measures the similarity of a signal by itself over time whereas a cross-correlation function measures the similarity of a signal with another signal. A conventional approach is to use linear interpolation to determine fine code phase. This approach relies on the fact that an ideal autocorrelation function of the GPS C/A code with infinite bandwidth is a triangle. To overcome these problems a novel multistage fitting technique is developed herein to derive accurate code phase measurement based on a very short data length.

The normalized version of I and Q samples, which are more convenient for performance analysis, are given by:

$$I_i = \frac{\sin(\pi \Delta f T)}{\pi \Delta f T} \sqrt{2 \frac{S}{N_0} T} \, R(\tau) D_i \cos(\Delta \Phi_i) + \eta_i \quad (2.1)$$

$$Q_i = \frac{\sin(\pi \Delta f T)}{\pi \Delta f T} \sqrt{2 \frac{S}{N_0} T} \, R(\tau) D_i \sin(\Delta \Phi_i) + \eta_Q$$

$$E(\eta_i^2) = E(\eta_Q^2) = 1$$

Where $D_i(t)$ is 50 bps data modulation; $\Delta f$ is the frequency misalignment between the incoming samples and local carrier replica; $\Delta \Phi_i$ is the phase misalignment;

$$\frac{S}{N_0}$$

is the signal to noise density; T is the coherent integration time; $\eta_i$ is the normalized in-phase noise component with N(0, 1) distribution; $\eta_Q$ is the normalized Quadrature-phase noise component with N(0, 1) distribution; $E(\eta_i^2)$ and $E(\eta_Q^2)$ are the estimation of power for the noise components; $R(\tau)$ is the autocorrelation of the C/A code and $\tau$ is the code phase offset.

The auto-correlation can be expressed as:

$$R(\tau) = \int_{-\infty}^{\infty} c(t) c(t-\tau) dt \quad (2.2)$$

where c(t) is the C/A code.

For the GPS C/A code signal, the autocorrelation function is correlated within the C/A code chip duration and is traditionally approximated by a triangular function as follows:

$$R(\tau) = \begin{cases} \left(1 - \frac{|\tau|}{T_c}\right) & |\tau| \le T_c \\ 0 & \text{else} \end{cases} \quad (2.3)$$

where $T_c$ is the chip period of the C/A code.

Since the front-end bandwidth will affect the shape of the auto-correlation function, a narrower bandwidth will lead to a smoothened triangle function due to front-end filtering. The assumption of a perfect triangle is valid only for a front-end with an unlimited bandwidth which is almost always not true since most front-end suppresses out-of-band noise with band-pass filters. The bandwidth for an off-the-shelf receiver is typically 2 MHz so that the noise out of the main lobe of C/A code can be rejected. The limited front-end bandwidth smoothes the correlation peak and attenuates the correlation energy. As a result, the autocorrelation function should be modified as follows:

$$F[R(\tau)] = \int_{-\infty}^{\infty} F[c(t)]c(t-\tau)dt \quad (2.4)$$

where $F[c(t)]$ is the filtered version of the C/A code and $F[R(\tau)]$ is the autocorrelation function of the GPS signal by considering the effect of the front-end The present system and method utilizes equation (2.4) to estimate the code phase offset. The estimation consists of a two stage fitting process. $F[c(t)]$ is derived by passing a GPS C/A code through an accurately modeled front-end IF filter. $F[R(\tau)]$ is derived by cross correlating a locally generated C/A code with a filtered C/A code. The general shape of the $F[R(\tau)]$ will then be fitted by a suitable mathematical function where empirical evidence shows it can be accurately represented by a sinusoid series. As a result:

$$F[R(\tau)] = \sum_{i=1}^{n} a_i \sin(b_i \tau + c_i) \quad (2.5)$$

where $a_i$, $b_i$ and $c_i$ can be determined by fitting a sinusoid series to the cross correlation between a locally generated C/A code and a filtered C/A code.

These values are front-end dependent and vary depending on the front-end filter bandwidth and type of filter (for instance Butterworth filter or Chebychev filter). Note that these calculations can be done offline and $a_i$, $b_i$ and $c_i$ can be stored in memory.

By removing the Doppler effect in the GPS signal with the fine Doppler frequency estimate and utilizing coarse code phase, several correlation samples around the peak can be measured. Since each visible satellite has different received signal power, the amplitude of the autocorrelation can vary among satellites. After deriving several correlation samples, the final fitting function $\Omega$ is fitted to the correlation samples around the peak to derive the amplitude A and fine code phase offset $\tau$.

$$\Omega(A, \tau) = A\left(\sum_{i=1}^{n} a_i \sin(b_i \tau + c_i)\right) \quad (2.6)$$

This technique improves the final position accuracy as well as dramatically reduces the worst case position errors compared with prior arts.

FIG. 6 illustrates the Fine Code Phase Estimation Utility. The process starts at the Start-Point 602. N ms of navigation bit transition free data that is from the output of 530 is obtained at 606 along with the coarse code phase and fine Doppler frequency 608 via fork 604 and is dispatched to join 610 to calculate several correlation samples at 622. The actual number of correlation samples depends on factors such as the sampling rate and desired curve fitting accuracy. The C/A code is generated at 614 and filtered at 612 where the filtering effect of the front-end was modeled in advance. Join 616 dispatches the filtered C/A code at 612 and the C/A code at 614 to 618 to derive the cross correlation. At 620, a sinusoid series or similar functions is fitted to the cross correlation function around the peak and the coefficients $a_i$, $b_i$, and $c_i$ are determined. The fitting function 620 along with several correlation samples 622 is then dispatched to a second fitting module at 626 via 624 where the amplitude A and the fine code phase are estimated by fitting a predetermined fitting function to several correlation samples and, finally, the process ends at end-point 628. The dotted boundary of 612, 614, 618 and 620 indicate that these activities may be performed in advance or at run time.

3. Coarse Estimation Utility

The Coarse Estimation Utility may generate a coarse receiver position and an initial TOT of GNSS signals for the TOT Construction Utility and the Fine PVT Utility based on the Doppler frequency measurements provided by the Measurement Generation Utility, a coarse GNSS time from the Clock Obtaining Means, and the available Ephemeris or Almanac. If the accuracy of the coarse receiver position already meets the specified requirements of TTFF's position accuracy, the PVT Engine may report success and stop. Otherwise, the positioning procedure will be passed to the TOT Construction Utility and the Fine PVT Utility.

It should be understood by an expert in the art that, given sufficient accurate estimates of initial receiver position and TOA from some source other than Doppler positioning, a coarse TOT can be calculated to serve the same purpose.

3.1 PVT Determination with Doppler Frequency Measurements

The Coarse Estimation Utility may calculate PVT based on the Doppler frequency measurements generated by the Measurement Generation Utility. The Coarse Estimation Utility may provide a weighted least squares technique to assign proper weight for each Doppler frequency measurement to further improve the accuracy of PVT determination. In practice, if the receiver dynamic is either static or low dynamic, the PVT Engine may discard the receiver velocities from the estimation.

FIG. 7 illustrates how the PVT Engine determines the coarse PVT. The PVT Engine begins at the Start-Point 702, and enters the Coarse Estimation Utility 704. The PVT engine may determine whether an initial position is known at 706. The initial position may be provided by the coarse position or the default position. If the coarse position is already known, it will be used as shown at 708. Otherwise, a default position may be used at 710. The default position may be set to the center of the earth. The coarse or the default position is sent to the following procedure through Merge 712. The Atmosphere component 714, which includes the ionospheric and tropospheric models and parameters, together with the Multipath component 716, which includes the Multipath model and parameters, may be optionally added to the process. Other than 714 and 716, the PVT engine requires ephemerides 718, coarse time 720, and Doppler frequency measurements 722. Only when all of them are available at 724, the PVT engine starts the algorithm to compute the receiver PVT with Doppler frequency measurement and LSQ at 726. The "rake" symbol, which represents a hierarchy, indicates action 726 can be expanded into another UML activity diagram. If the PVT accuracy already meets the requirements, as shown at Decision 728, the PVT engine will exit the Coarse Estimation Utility 732 and exit the PVT engine at the End-Point 738. If the PVT accuracy does not meet the requirements yet, the PVT engine will display and handle the error at 730 then exit at 734.

Action 726 can be expanded into another UML activity diagram, as illustrated in FIG. 8. The process begins at the Start-Point 802, and enters the least squares (LSQ) algorithm at 804. After obtaining the coarse TOT, the initial receiver position, ephemeris data and Doppler measurements at 806, the process calculates measured range rates at 808 with Doppler frequency measurements and sets up the linearized measurement functions with five system states at 810. By going through Merge 812, the process enters an iteration loop. In the iteration loop, the process obtains or calculates satellite positions, velocities and accelerations based on the ephemeris data and TOT at 814. Then, the process calculates the increments of five system states at 816 and updates the five system states with height and TOT constraints at 818. At Decision 820, if the maximum iterations have not been reached, the iteration will continue through 812. Otherwise, the process exits at End-Point 822.

The mathematical method or model of Doppler positioning can be explained as follows. If the measured Doppler frequency for satellite i is $\tilde{f}_D^{(i)}$, a delta range $\dot{\rho}^{(i)}$ can be defined as:

$$\dot{\rho}^{(i)} = -\tilde{f}_D^{(i)} \frac{c}{L_1} \quad (3.1)$$

Where c is the speed of light; $L_1$ is the carrier frequency transmitted by the satellite.

Meanwhile, with reference to FIG. 11, the delta range $\dot{\rho}^{(i)}$ can also be related to a nonlinear function with the velocity and position vectors of the satellite and the receiver as:

$$\dot{\rho}^{(i)} = (v_i - v_u) \cdot \frac{(r_i - \hat{r}_u)}{\|r_i - \hat{r}_u\|} + \dot{d} \quad (3.2)$$

Where
$v_i = [v_{xi}\ v_{yi}\ v_{zi}]^T$ is the velocity vector of Satellite i
$v_u = [v_{xu}\ v_{yu}\ v_{zu}]^T$ is the velocity vector of the receiver
$r_i = [x_i\ y_i\ z_i]^T$ is the position vector of Satellite i
$\hat{r}_u = [\hat{x}_u\ \hat{y}_u\ \hat{z}_u]^T$ is the estimated position vector of the receiver
$\|r_i - \hat{r}_u\|$ is the vector norm
"●" is the dot product operation of two vectors
$\dot{d}$ is the local clock drift effect The nonlinear term in Equation (3.2) is written as follows:

$$f_i(\hat{r}_u, \hat{t}_t) = f_i(\hat{x}_u, \hat{y}_u, \hat{z}_u, \hat{t}_t) = (v_i - v_u) \cdot \frac{(r_i - \hat{r}_u)}{\|r_i - \hat{r}_u\|} \quad (3.3)$$

Where $\hat{t}_t$ is the estimate of the signal TOT

Based on Equation (3.2) and (3.3), and assuming that the receiver is static, the delta range can be linearized with the Taylor series expansion as $$\dot{\rho}^{(i)} = f_i(\hat{r}_{u,0}, \hat{t}_{t,0}) + \dot{d}_0 + \left[\frac{\partial f_i(\hat{r}_{u,0}, \hat{t}_{t,0})}{\partial \hat{r}_{u,0}}\ \frac{\partial f_i(\hat{r}_{u,0}, \hat{t}_{t,0})}{\hat{t}_{t,0}}\ 1\right]\begin{bmatrix}\Delta \hat{r}_u \\ \Delta \hat{t}_t \\ \Delta \dot{d}\end{bmatrix} \quad (3.4)$$

In Equation (3.4), the five system states or state variables can be expressed as $$X = [\hat{r}_u\ \hat{t}_t\ \dot{d}]^T = [\hat{x}_u\ \hat{y}_u\ \hat{z}_u\ \hat{t}_t\ \dot{d}]^T \quad (3.5)$$

Thus, the delta system states $\Delta X$ can be calculated with LSQ algorithm $$\Delta X = (A^T A)^{-1} A^T E \quad (3.6a)$$

Where E is the delta range residual vector or array and A is the derivation matrix.
E and A can be expressed as:

$$E = \begin{bmatrix} \dot{\rho}^{(1)} - f_1(\hat{r}_{u,0}, \hat{t}_{t,0}) - \dot{d}_0 \\ \dot{\rho}^{(2)} - f_2(\hat{r}_{u,0}, \hat{t}_{t,0}) - \dot{d}_0 \\ \ldots \\ \dot{\rho}^{(n)} - f_n(\hat{r}_{u,0}, \hat{t}_{t,0}) - \dot{d}_0 \end{bmatrix} \quad (3.6b)$$

$$A = \begin{bmatrix} \frac{\partial f_1(\hat{r}_{u,0}, \hat{t}_{t,0})}{\partial \hat{r}_{u,0}} & \frac{\partial f_1(\hat{r}_{u,0}, \hat{t}_{t,0})}{\hat{t}_{t,0}} & 1 \\ \frac{\partial f_2(\hat{r}_{u,0}, \hat{t}_{t,0})}{\partial \hat{r}_{u,0}} & \frac{\partial f_2(\hat{r}_{u,0}, \hat{t}_{t,0})}{\hat{t}_{t,0}} & 1 \\ \ldots & \ldots & \ldots \\ \frac{\partial f_n(\hat{r}_{u,0}, \hat{t}_{t,0})}{\partial \hat{r}_{u,0}} & \frac{\partial f_n(\hat{r}_{u,0}, \hat{t}_{t,0})}{\hat{t}_{t,0}} & 1 \end{bmatrix} \quad (3.6c)$$

Based on Equation (3.6), the system states can be calculated by the iteration as $$\Delta X_k = (A(X_k)^T A(X_k))^{-1} A(X_k)^T E(X_k) \quad (3.7)$$
$$X_1 = X_0 + \Delta X_0$$
$$\vdots$$
$$X_k = X_{k-1} + \Delta X_{k-1}$$

For the convergence of PVT calculation in the LSQ iteration, the update constraints of state variables can be used. The TOT update constraint can be expressed as:

$$|\hat{t}_{t,k} - \hat{t}_{t,0}| < \text{Time Constraint} \quad (3.8)$$

where the Time Constraint may, for example, be set to 30 minutes.

The Coarse Estimation Utility requires an initial estimated TOA error to be within a few tens of minutes. Such loose requirement on the initial time accuracy may enable the RF circuitry to continue to work for years without calibration or alignment on their clock.

Assuming only 2~10 ms of I/Q samples is used, the position error of the Coarse Estimation Utility may be within 100 kilometers and the TOT error may be within 100 seconds for both low and high dynamic conditions.

4. TOT Construction Utility

The TOT Construction Utility reconstructs a TOT for each satellite in the absence of decoded satellite navigation data. This constructed TOT is relative to an estimated TOA of the GNSS signal, so it will not be the same as the true TOT and will not be accurate for computing the satellite position, velocity, acceleration and clock from the ephemeris data. The present system and method generates an accurate full pseudorange from the relative TOT.

FIG. 9 illustrates the TOT construction process. The process begins at Start-Point 902 and enters the TOT Construction Utility at 904. Coarse user position, coarse TOA, and coarse TOT are obtained from the Coarse Estimation Utility at 906. The Atmosphere component 908, which includes the ionospheric and tropospheric models and parameters, together with the Multipath component 910, which includes the Multipath model and parameters, may be optionally added to the process. When the satellite Ephemerides 912 and Measured Code Phases 914 are available at Join 916, the obtained data goes through Join 918 to be used in the Common Bias Estimation Set Generator 920 to calculate a separate common bias estimate for each satellite.

At Decision 922, if Coarse TOT Error Mitigation is to be performed, the Coarse TOT Error Mitigation 924 calculates improved coarse TOT for each satellite and re-enters the process at Join 918. If Coarse TOT Error Mitigation is not to be performed or has already been performed, the process enters Decision 926. If Coarse Position Error Mitigation is to be performed, Coarse Position Error Mitigation 928 uses a daisy chain process to update the common bias estimates and calculate integer code epoch times for each satellite and continues to Join 932. If Coarse Position Error Mitigation is not to be performed, the Common Bias Estimator 930 calculates a single common bias from the set of estimates for each satellite, calculates integer code epoch times and continues to Join 932.

After Join 932, the Pseudorange Generator 934 constructs the TOT and full pseudorange measurement for each satellite. The TOT Construction Utility exits at 936 and reaches End-Point 938.

4.1 Generating Pseudorange

The signal transmitted by a GNSS satellite is a time signal. That is, at any moment, the signal currently being transmitted represents a time referenced to the satellite clock. In a GNSS receiver where the navigation data is decoded, the current time of week can be extracted from the encoded data and referenced to a specific point in the transmitted signal. The TOT can be determined by the amount of C/A code that is transmitted relative to that point. The C/A code repeats every 1 ms, so each time the code repeats it represents 1 ms of time and the current code phase measurement represents a fractional portion of 1 ms.

A pseudorange that has not been corrected for the satellite clock error can be called the "raw pseudorange". The pseudorange used in this discussion will be the raw pseudorange. The pseudorange measurement for a satellite i can be expressed as $$\rho^{(i)} = (t_a - t_t^{(i)}) \cdot c \quad (4.1)$$

where
- $t_a$ is the TOA of the received signal relative to the receiver clock,
- $t_t^{(i)}$ is the TOT for satellite i relative to the satellite clock, and
- c is the speed of light.

If a conventional GNSS receiver has no knowledge of time at start-up, the TOA may be estimated relative to one or more values of TOT plus some nominal offset. This initial TOA will have an absolute error on the order of tens of milliseconds. If the receiver has already been initialized, TOA will usually be known well under 1 ms.

The relationship between the raw pseudorange and the true distance the signal traveled is well known to be $$\rho^{(i)} = \|r_u - r_i\| - \delta t^{(i)} \cdot c + b \cdot c \quad (4.2)$$

where
- $r_i$ is the position of the satellite i calculated at the TOT and corrected for the Earth's rotation over the transit time,
- $r_u$ is the receiver position,
- $\delta t^{(i)}$ is the satellite clock correction for satellite i calculated at the TOT, and
- b is the receiver common bias.

From equations (4.1) and (4.2), TOT can be calculated as $$t_t^{(i)} = t_a - \|r_u - r_i\|/c + \delta t^{(i)} - b \quad (4.3)$$

4.2 Generating Pseudorange from a Constructed TOT

A key problem in designing a receiver using snapshot techniques is that the short sampling time precludes decoding the time of week from the transmitted data. The code phase can be measured to determine the fractional millisecond portion of time, but there is no reference time available to recover the full TOT.

The Coarse Estimation Utility provides a coarse receiver position ($\hat{r}_u$) and TOA ($\hat{t}_a$), where the TOA refers to the beginning of the I/Q samples. It also provides the coarse position ($\hat{r}_i$) and clock correction ($\delta\hat{t}^{(i)}$) for each satellite that were evaluated at the coarse TOT ($\hat{t}_t^{(i)}$) during the least squares process. The coarse TOT is not accurate enough to directly calculate the same pseudorange as in conventional GPS. The TOT Construction Utility constructs a new TOT ($\tilde{t}_t^{(i)}$) for each satellite that is still relative to the TOA, but can be used to generate the pseudorange. That is, where $$\rho^{(i)} = (t_a - t_t^{(i)}) \cdot c = (\hat{t}_a - \tilde{t}_t^{(i)}) \cdot c \quad (4.4)$$

Based on equations (4.3) and (4.4), the constructed TOT for satellite i is $$\tilde{t}_t^{(i)} = \hat{t}_t^{(i)} + \epsilon_t^{(i)} + \epsilon_r^{(i)} = \hat{t}_a - \|\hat{r}_u - \hat{r}_i\|/c + \delta\hat{t}^{(i)} - b + \epsilon_t^{(i)} + \epsilon_r^{(i)} \quad (4.5)$$

where
- $\epsilon_t^{(i)}$ is the coarse TOT error contribution, which is the error due to $\hat{r}_i$ and $\delta\hat{t}^{(i)}$ being evaluated at $\hat{t}_t^{(i)}$ instead of the true TOT $t_t^{(i)}$; and
- $\epsilon_r^{(i)}$ is the coarse position error contribution, which is due to the error in.

With the unknown common bias b and the errors $\epsilon_t^{(i)}$ and $\epsilon_r^{(i)}$, $\tilde{t}_t^{(i)}$ cannot be constructed well enough to generate the pseudorange. The next step is to find a TOT that can be fixed to an integer.

Each time the C/A PRN code restarts, the code phase will be zero. The TOT when a zero code phase is broadcast can be called the "code epoch time", which will be an integer when expressed in milliseconds. At any arbitrary time, the "fractional code phase time" $\Delta t_s^{(i)}$ is the portion of one millisecond $\Delta t_s^{(i)}$ that has passed since the last code epoch time $\tau^{(i)}$ and can be calculated from the code phase measurement. Then, the TOT of a received signal can be expressed as $$t_t^{(i)} = \tau^{(i)} + \Delta t_s^{(i)} \quad (4.6)$$

FIG. 12 illustrates the relationship between the TOT, the code epoch time, and the fractional code phase time.

Therefore, the most recent TOT which would have been a code epoch time can be estimated as $$\hat{\tau}^{(i)} = t_t^{(i)} - \Delta t_s^{(i)} = \hat{t}_a - \|\hat{r}_u - \hat{r}_i\|/c + \delta\hat{t}^{(i)} - \Delta t_s^{(i)} - b + \epsilon_t^{(i)} + \epsilon_r^{(i)} \quad (4.7)$$

If b can be estimated as $\hat{b}$, an integer code epoch time $\tau^{(i)}$ can be calculated by rounding $\hat{\tau}^{(i)}$, provided that $\hat{b}-b+\epsilon_t^{(i)}+\epsilon_r^{(i)}<0.5$ ms. Then the integer code epoch time is $$\tau^{(i)}=\text{round}(\hat{\tau}^{(i)})=\text{round}(\hat{t}_a-\|\hat{r}_u-\hat{r}_i\|/c+\delta\hat{t}^{(i)}-\Delta t_s^{(i)}-\hat{b}) \quad (4.8)$$

Once the integer code epoch time for each satellite is determined, the TOT for each satellite may be calculated and the raw pseudorange constructed as)

$$\rho^{(i)}=(\hat{t}_a-\tilde{t}_t^{(i)})\cdot c=(\hat{t}_a-(\tau^{(i)}+\Delta t_s^{(i)}))\cdot c \quad (4.9)$$

What remains is estimating the common bias b sufficiently to find the integer code epoch time for each satellite. Using equation (4.7), a separate estimate of b for each satellite is $$\hat{b}^{(i)}=b-\epsilon_t^{(i)}-\epsilon_r^{(i)}=\hat{t}_a-\|\hat{r}_u-\hat{r}_i\|/c+\delta\hat{t}^{(i)}-\Delta t_s^{(i)}-\hat{\tau}^{(i)} \quad (4.10)$$

In the case of conventional GPS, a receiver common bias will be solved for in the least squares position algorithm. The initial TOA constructed from TOT can be in error by several milliseconds, and changing it arbitrarily by several milliseconds will be absorbed by the common bias harmlessly. Analogously, in the present utility where the TOT is constructed from TOA, it can be assumed that b<1 ms.

Taking the 1 ms modulus of equation (4.10), the code epoch time $\hat{\tau}^{(i)}$ drops out because it should be an integer. Using the operator "( )[ms]" to denote modulo 1 ms, the modulo common bias estimates become $$\check{b}^{(i)}=(\hat{b}^{(i)})[ms]=(\hat{t}_a-\|\hat{r}_u-\hat{r}_i\|/c+\delta\hat{t}^{(i)}-\Delta t_s^{(i)})[ms] \quad (4.11)$$

To determine a single estimate $\hat{b}$ from the set $\{\check{b}^{(i)}\}$, care must be taken that it does not lead to the wrong integer value for $\tau^{(i)}$ for any satellite. Note that it is acceptable if $\hat{\tau}^{(i)}$ for all satellites are offset by a constant integer number of milliseconds. It is the relative amount between satellites that could cause one or more invalid pseudoranges.

When the coarse TOT error contribution $\epsilon_t^{(i)}$ and coarse position error contribution $\epsilon_r^{(i)}$ are small, so will the deviations be among the values of $\{\check{b}^{(i)}\}$. In this case, a good estimate of b will be apparent. When coarse error contributions are larger, it becomes more difficult to obtain $\hat{\tau}^{(i)}$ that is close to an integer for all satellites. In particular, $\epsilon_t^{(i)}$ will be largest for satellites with a high range rate and $\epsilon_r^{(i)}$ will be largest for satellites where the line of sight aligns closely to the direction of coarse position error. Integer errors for $\tau^{(i)}$ occur when $\hat{b}-b+\epsilon_t^{(i)}+\epsilon_r^{(i)}\geq 0.5$ ms.

A simple example of a single estimate of b is to fix $\hat{b}=\check{b}^{(L)}$ for a satellite L that is assumed to have the smallest coarse error contributions, likely the satellite with the highest elevation angle or with the shortest range. Another example is a direct search of trial values of $\hat{b}$ over the interval of (−0.5, +0.5] ms, to test for the one that minimizes the following function for n satellites, based on equation (4.8):

$$\Sigma_{i=1}^n(\hat{\tau}^{(i)}-\tau^{(i)})^2 \quad (4.12)$$

The TOT Construction Utility may employ enhanced error mitigation to improve the determination of $\hat{\tau}^{(i)}$. Coarse TOT error mitigation may be used to reduce the effect of $\tau_t^{(i)}$ by improving the coarse time and satellite position estimates. Coarse position error mitigation may be used to reduce the effect of $\epsilon_r^{(i)}$ with a method to determine the integer code epoch times $\tau^{(i)}$ without a single estimate of the common bias.

4.3 Coarse TOT Error Mitigation

The TOT Construction Utility may employ coarse TOT error mitigation as a method to reduce the effect of $\epsilon_t^{(i)}$. The coarse TOT error contribution for satellite i can be expressed as $$\epsilon_t^{(i)}(\hat{t}_t^{(i)},t_t^{(i)})=D_i(t_t^{(i)})-D_i(\hat{t}_t^{(i)})\approx \dot{D}_i(t_t^{(i)})\cdot(t_t^{(i)}-\hat{t}_t^{(i)}) \quad (4.13)$$

where
$D_i(t)=\|r_u-r_i(t)\|/c-\delta t^{(i)}(t)$ is the propagation delay for any TOT t, and
$\dot{D}_i(t)$ is the range rate determined from the ephemeris data for any TOT t.

For any pair of satellites, i and j, the difference between $\check{b}^{(i)}$ and $\check{b}^{(j)}$ is $$\check{b}^{(i)}-\check{b}^{(j)}=(b-\epsilon_t^{(i)}-\epsilon_r^{(i)})-(b-\epsilon_t^{(j)}-\epsilon_r^{(j)}) \quad (4.14)$$
$$=-(\epsilon_t^{(i)}-\epsilon_t^{(j)})-(\epsilon_r^{(i)}-\epsilon_r^{(j)})$$

Whenever the two satellites are close together in the sky, they will have similar coarse position error contributions (i.e. $(\epsilon_r^{(i)}-\epsilon_r^{(j)})\rightarrow 0$). It will also be true that the amount of time error $\Delta t$ will be close for the two satellites, i.e.

$$\Delta t \approx t_t^{(i)}-\hat{t}_t^{(i)}\approx t_t^{(j)}-\hat{t}_t^{(j)} \quad (4.15)$$

Therefore, if satellites i and j are the two that are mutually the closest of all satellites, from equations (4.13) through (4.15), then:

$$\check{b}^{(i)}-\check{b}^{(j)}\approx -(\epsilon_t^{(i)}-\epsilon_t^{(j)})\approx -(\dot{D}_i(\hat{t}_t^{(i)})-\dot{D}_j(\hat{t}_t^{(j)}))\cdot \Delta t \quad (4.16)$$

$$\Delta t \approx -(\check{b}^{(i)}-\check{b}^{(j)})/(\dot{D}_i(\hat{t}_t^{(i)})-\dot{D}_j(\hat{t}_t^{(j)})) \quad (4.17)$$

Then coarse estimates for the TOT Construction Utility may be improved where
$\tilde{t}_a'=\hat{t}_a+\Delta t$ is the improved coarse TOA,
$\hat{t}'_t^{(i)}=\hat{t}_{t_i}+\Delta t$ is the improved coarse TOT for satellite i,
$\hat{r}'_i$ is the position of the satellite i calculated for $\hat{t}'_t^{(i)}$ and corrected for the Earth's rotation over the transit time, and
$\delta\hat{t}'^{(i)}$ is the satellite clock correction for satellite i calculated for $\hat{t}'_t^{(i)}$.

4.4 Coarse Position Error Mitigation

The TOT Construction Utility may employ coarse position error mitigation as a method to determine the integer code epoch times $\tau^{(i)}$ without a direct estimate of the common bias b. As described above, for any two satellites i and j that are close together in the sky, $(\epsilon_r^{(i)}-\epsilon_r^{(j)})\rightarrow 0$ and $\check{b}^{(i)}$ will be similar to $\check{b}^{(j)}$. The coarse position error mitigation method uses an adaptive estimate of the common bias for a satellite based on the common bias of the nearest neighbouring satellite in a "daisy chain" approach.

The first step is to choose any satellite as i=1 and fix the common bias as $\bar{b}^{(1)}=\check{b}^{(1)}$. This is the first element of a new set $\{\bar{b}^{(i)}\}$.

Then the second step is to choose the nearest neighbour to satellite 1 as satellite 2. Set the new estimate $\bar{b}^{(2)}$ with the following equation where, for this step, i=1 and j=2:

$$\bar{b}^{(j)}=\begin{cases}\check{b}^{(j)}, & |\check{b}^{(j)}-\bar{b}^{(i)}|<0.5 \text{ ms} \\ \check{b}^{(j)}-1 \text{ ms}, & |\check{b}^{(j)}-\bar{b}^{(i)}|>0.5 \text{ ms} \\ \check{b}^{(j)}+1 \text{ ms}, & |\check{b}^{(j)}-\bar{b}^{(i)}|<-0.5 \text{ ms}\end{cases} \quad (4.18)$$

For the third step, choose a new satellite pair i and j for equation (4.18), where satellite i is from those already represented in $\{\bar{b}^{(i)}\}$ and satellite j is from the remaining, such that the pair has the minimum distance between them. Continue until all satellites are represented in $\{\tilde{b}^{(i)}\}$.

The integer code epoch times may then be computed using equation (4.8), replacing $\hat{b}$ with $\tilde{b}^{(i)}$ for each satellite.

5. Fine PVT Utility

The Fine PVT Utility may calculate the fine PVT solution in a least squares (LSQ) algorithm based on the constructed TOTs and raw pseudoranges generated by the TOT Construction Utility.

FIG. 10 illustrates a procedure in which the Fine PVT Utility determines the fine PVT. The process begins at Start-Point 1002 and enters the Fine PVT Utility at 1004. At 1006, the coarse position, pseudoranges, constructed TOT and TOA from the TOT Construction Utility are obtained. Along with the values from the TOT Construction Utility, optional atmosphere component 1008 which includes the ionospheric and tropospheric models and parameters, optional multipath component 1010 which includes the Multipath model and parameters, and ephemerides 1012 are all sent to Join 1014. After the linearized measurement functions with five system states are setup at 1016, the process enters the LSQ iteration loop through Merge 1018. In the iteration loop, calculate satellite positions and velocities from the ephemerides and the estimated TOTs at 1020. Then calculate the delta system states at 1022 and update the five system states: the receiver position, the common bias and the common epoch time at 1024. With the epoch times of the first complete PRN epochs, update signal TOTs at 1026. At Branch 1028, if the maximum number of iterations is reached, the process enters Branch 1028. Otherwise, the process returns to the iteration loop through Merge 1018. At Branch 1028, if the fine PVT reaches the accuracy requirement, the procedure exits the Fine PVT Utility at 1034 and End-Point 1038. Otherwise, the process will display and handle the error at 1032 then exit at 1036.

The mathematical method or model for the pseudorange measurements can be explained as follows. Positions are expressed as Earth-Centered, Earth Fixed (ECEF) coordinates, but other coordinate systems may be used similarly. As mentioned in Section 4, the raw pseudorange of satellite i can be written as;

$$\rho^{(i)} = \|r_u - r_i\| - \delta t^{(i)} \cdot c + b \cdot c \quad (5.1)$$

Compared to conventional GPS, there will be a large error in the TOT used to compute the satellite position $r_i$ and clock correction $\delta t^{(i)}$. A fifth state may be used in the LSQ algorithm to account for the large TOT error. Let $\tau_0$ represent a common integer code epoch time with an initial value of $\tau^{(i)}$ for some satellite i, as defined in Section 4. Then let there be fixed integer offsets $\Delta\tau^{(i)}$ for each satellite such that the TOT can be updated from the common integer code epoch time and the fractional code phase time:

$$t_t^{(i)} = \tau^{(i)} + \Delta t_s^{(i)} = \tau_0 + \Delta\tau^{(i)} + \Delta t_s^{(i)} \quad (5.2)$$

The state vector can then be written as $$w = [x_u, y_u, z_u, b, \tau_0]^T \quad (5.3)$$

where $(x_u, y_u, z_u)$ is the receiver position. The satellite position and clock correction is recalculated when $\tau_0$ is updated. The measurement function can be derived from equation (5.1) as $$\rho^{(i)} = \|(x_u, y_u, z_u) - r_i(t_t^{(i)}(\tau_0), \delta t^{(i)})\| - \delta t^{(i)}(t_t^{(i)}(\tau_0)) \cdot c + b \cdot c \quad (5.4)$$

Similar to Doppler positioning, the measurement function can be written as a non-linear function:

$$\rho^{(i)} = g_i(w) \quad (5.5)$$

The function may then be linearized with the Taylor series expansion and solved with LSQ algorithm or weighted LSQ algorithm. The system state increments may be held to position constraints (e.g. 100 km) and/or time constraints (e.g. 60 seconds).

The PVT solution of LSQ algorithm is the estimate $\hat{w} = [\hat{x}_u, \hat{y}_u, \hat{z}_u, \hat{b}, \hat{\tau}_0]^T$ of the five system states.

Thus, in an embodiment, there is disclosed a system for determining one or more of position, velocity, and time (PVT) from signal samples of global navigation satellite systems (GNSS), comprising: a GNSS Sample Obtaining Means for obtaining in-phase and/or quadrature (I/Q) samples of signals from one or more GNSS satellites; a Clock Obtaining Means for obtaining an initial estimated time of arrival (TOA) of the I/Q samples; a Parameter Obtaining Means for obtaining satellite ephemeris data, which includes satellite orbit and clock information of the one or more GNSS satellites; and a PVT engine comprising: a Measurement Generation Utility to compute Doppler frequency measurements and code phase measurements of the one or more GNSS from the I/Q samples; a Coarse Estimation Utility to estimate a coarse PVT, coarse TOA, and coarse satellite signal times of transmission (TOT) from the Doppler frequency measurements, the initial TOA, the satellite ephemeris data; a TOT Construction Utility to determine refined TOTs relative to the coarse TOA and generate full pseudorange measurements by determining integer code epoch times from the code phase measurements, the coarse PVT, the coarse TOTs, and the satellite ephemeris data; and a Fine PVT Utility to calculate fine PVT from the code phase measurements, the coarse PVT, the coarse TOA, the refined TOTs, and the satellite ephemeris data.

In an embodiment, the Measurement Generation Utility uses a multistage detection and estimation method in which each stage may utilize a different sample length, comprising: a Detection and Coarse Measurement Generation Utility to detect satellites and determine coarse Doppler frequency and coarse code phase from M ms of the I/Q sample data; a Fine Doppler Frequency Estimation Utility to determine fine Doppler frequency measurements from the coarse Doppler frequency and 2N ($\geq$M) ms of the I/Q sample data; and a Fine Code Phase Estimation Utility to determine fine code phase measurements from the coarse code phase, fine Doppler frequency, and N ms of the I/Q sample data.

In another embodiment, the Detection and Coarse Measurement Generation Utility performs coherent and non-coherent integration on the I/Q sample data.

In another embodiment, the Fine Doppler Frequency Estimation Utility performs narrow frequency searches around the coarse Doppler frequency from subsets of the 2N ms of the I/Q sample data and determines the fine Doppler frequency measurement from the subset with the maximum correlation value.

In another embodiment, the Fine Code Phase Estimation Utility uses a predefined autocorrelation function that models the effect of the specific front end on the C/A code.

In another embodiment, the predefined autocorrelation function is a curve fit to a specific mathematical function or series of functions that models the effect of the specific front end on the C/A code.

In another embodiment, the predefined autocorrelation function is fitted to the correlation values to determine the fine code phase and the signal power.

In another embodiment, the signal power is estimated from the maximum value of the fitted autocorrelation function.

In another embodiment, the Coarse Estimation Utility uses a time update constraint in a least squares algorithm to improve convergence of the coarse PVT and the coarse TOTs.

In another embodiment, the TOT Construction Utility uses an estimated common bias to determine the integer code epoch times.

In another embodiment, the TOT Construction Utility employs coarse TOT error mitigation to use neighbouring satellites to reduce the error in the coarse TOTs and coarse TOA.

In another embodiment, the TOT Construction Utility employs coarse position error mitigation to use a satellite daisy chain to reduce the probability of determining wrong integer code epoch times due to errors in the coarse position.

In another aspect, there is provided a method of determining one or more of position, velocity, and time (PVT) from signal samples of global navigation satellite systems (GNSS), comprising: obtaining, with a GNSS Sample Obtaining Means, in-phase and/or quadrature (I/Q) samples of signals from one or more GNSS satellites; obtaining, with a Clock Obtaining Means, an initial estimated time of arrival (TOA) of the I/Q samples; obtaining, with a Parameter Obtaining Means, satellite ephemeris data, which includes satellite orbit and clock information of the one or more GNSS satellites; computing, with a Measurement Generation Utility, Doppler frequency measurements and code phase measurements of the one or more GNSS from the I/Q samples; estimating, with a Coarse Estimation Utility, a coarse PVT, coarse TOA, and coarse satellite signal times of transmission (TOT) from the Doppler frequency measurements, the initial TOA, the satellite ephemeris data; determining, with a TOT Construction Utility, refined TOTs relative to the coarse TOA and generate full pseudorange measurements by determining integer code epoch times from the code phase measurements, the coarse PVT, the coarse TOTs, and the satellite ephemeris data; and calculating, with a Fine PVT Utility, fine PVT from the code phase measurements, the coarse pvt, the coarse TOA, the refined TOTs, and the satellite ephemeris data.

In an embodiment, the Measurement Generation Utility uses a multistage detection and estimation process in which each stage may utilize a different sample length, and the method further comprises: detecting satellites with a Detection and Coarse Measurement Generation Utility and determining coarse Doppler frequency and coarse code phase from M ms of the I/Q sample data; determining, with a Fine Doppler Frequency Estimation Utility, fine Doppler frequency measurements from the coarse Doppler frequency and 2N (≥M) ms of the I/Q sample data; and determining, with a Fine Code Phase Utility, fine code phase measurements from the coarse code phase, fine Doppler frequency, and N ms of the I/Q sample data.

In another embodiment, the Detection and Coarse Measurement Generation Utility performs coherent and non-coherent integration on the I/Q sample data.

In another embodiment, the Fine Doppler Frequency Estimation Utility performs narrow frequency searches around the coarse Doppler frequency from subsets of the 2N ms of the I/Q sample data and determines the fine Doppler frequency measurement from the subset with the maximum correlation value.

In another embodiment, the Fine Code Phase Estimation Utility uses a predefined autocorrelation function that models the effect of the specific front end on the C/A code.

In another embodiment, the predefined autocorrelation function is a curve fit to a specific mathematical function or series of functions that models the effect of the specific front end on the C/A code.

In another embodiment, the predefined autocorrelation function is fitted to the correlation values to determine the fine code phase and the signal power.

In another embodiment, the signal power is estimated from the maximum value of the fitted autocorrelation function.

In another embodiment, the Coarse Estimation Utility uses a time update constraint in a least squares algorithm to improve convergence of the coarse PVT and the coarse TOTs.

In another embodiment, the TOT Construction Utility uses an estimated common bias to determine the integer code epoch times.

In another embodiment, the TOT Construction Utility employs coarse TOT error mitigation to use neighbouring satellites to reduce the error in the coarse TOTs and coarse TOA.

In another embodiment, the TOT Construction Utility employs coarse position error mitigation to use a satellite daisy chain to reduce the probability of determining wrong integer code epoch times due to errors in the coarse position.

In another aspect, there is provided a non-volatile computer readable media storing computer code that, when loaded into a system for determining one or more of position, velocity, and time from global navigation satellite samples, adapts the system to perform one of the methods as described above.

In another aspect, there is provided a position, velocity, and time (PVT) engine for use in a system for determining one or more of position, velocity, and time (PVT) from signal samples of global navigation satellite systems (GNSS), the PVT engine comprising: a Measurement Generation Utility to compute Doppler frequency measurements and code phase measurements of the one or more GNSS from in-phase and/or quadrature I/Q samples obtained from one or more GNSS satellites; a Coarse Estimation Utility to estimate a coarse PVT, coarse time of arrival (TOA), and coarse satellite signal times of transmission (TOT) from the Doppler frequency measurements, an initial TOA obtained from the I/Q samples, and the satellite ephemeris data; a TOT Construction Utility to determine refined TOTs relative to the coarse TOA and generate full pseudorange measurements by determining integer code epoch times from the code phase measurements, the coarse PVT, the coarse TOTs, and the satellite ephemeris data; and a Fine PVT Utility to calculate fine PVT from the code phase measurements, the coarse pvt, the coarse TOA, the refined TOTs, and satellite ephemeris data including satellite orbit and clock information obtained from one or more GNSS satellites.

While the above description provides illustrative examples of systems and methods in accordance with one or more embodiments, it will be appreciated that other embodiments may be within the scope of the present description and the below claims as interpreted by one of skill in the art.

The invention claimed is:

1. A method of determining one or more of position, velocity, and time (PVT) from signal samples of global navigation satellite systems (GNSS), comprising:
   obtaining in-phase and/or quadrature (I/Q) samples of signals from one or more GNSS satellites;
   obtaining an initial estimated time of arrival (TOA) of the I/Q samples;
   obtaining satellite ephemeris data, which includes satellite orbit and clock information of the one or more GNSS satellites;
   computing, with a Measurement Generation Utility, Doppler frequency measurements and code phase measurements of the one or more GNSS from the I/Q samples;
   estimating, with a Coarse Estimation Utility, a coarse PVT, coarse TOA, and coarse satellite signal times of transmission (TOT) from the Doppler frequency measurements, the initial TOA, and the satellite ephemeris data;

determining, with a TOT Construction Utility, refined TOTs relative to the coarse TOA and generate full pseudorange measurements by determining integer code epoch times from the code phase measurements, the coarse PVT, the coarse TOTs, and the satellite ephemeris data; and calculating, with a Fine PVT Utility, fine PVT from the code phase measurements, the coarse PVT, the coarse TOA, the refined TOTs, and the satellite ephemeris data;

where GNSS PVT algorithms are used with the generated full pseudorange measurements in place of pseudorange measurements calculated from conventionally decoded TOTs.

2. The method of claim 1, wherein the Measurement Generation Utility uses a multistage detection and estimation process in which each stage may utilize a different sample length, and the method further comprises:

detecting satellites with a Detection and Coarse Measurement Generation Utility and determining coarse Doppler frequency and coarse code phase from M ms of the I/Q sample data;

determining, with a Fine Doppler Frequency Estimation Utility, fine Doppler frequency measurements from the coarse Doppler frequency and 2N ($\geq$; M) ms of the I/Q sample data; and determining, with a Fine Code Phase Estimation Utility, fine code phase measurements from the coarse code phase, fine Doppler frequency and N ms of the I/Q sample data.

3. The method of claim 2, wherein the Detection and Coarse Measurement Generation Utility performs coherent and non-coherent integration on the I/Q sample data.

4. The method of claim 2, wherein the Fine Doppler Frequency Estimation Utility performs narrow frequency searches around the coarse Doppler frequency from subsets of the 2N ms of the I/Q sample data and determines the fine Doppler frequency measurement from the subset with the maximum correlation value.

5. The method of claim 2, wherein the Fine Code Phase Estimation Utility uses a predefined autocorrelation function that models the effect of the specific front end on the C/A code.

6. The method of claim 5, wherein the predefined autocorrelation function is a curve fit to a specific mathematical function or series of functions that models the effect of the specific front end on the C/A code.

7. The method of claim 5, wherein the predefined autocorrelation function is fitted to the correlation values to determine the fine code phase and the signal power.

8. The method of claim 7, wherein the signal power is estimated from the maximum value of the fitted autocorrelation function.

9. The method of claim 1, wherein the Coarse Estimation Utility uses a time update constraint in a least squares algorithm to improve convergence of the coarse PVT and the coarse TOTs.

10. The method of claim 1, wherein the TOT Construction Utility uses an estimated common bias to determine the integer code epoch times.

11. The method of claim 1, wherein the TOT Construction Utility employs coarse TOT error mitigation to use neighbouring satellites to reduce the error in the coarse TOTs and coarse TOA.

12. The method of claim 1, wherein the TOT Construction Utility employs coarse position error mitigation to use a satellite daisy chain to reduce the probability of determining wrong integer code epoch times due to errors in the coarse position.

* * * * *